US008131096B2

(12) United States Patent
Chen et al.

(10) Patent No.: US 8,131,096 B2
(45) Date of Patent: Mar. 6, 2012

(54) VARIABLE LENGTH CODING FOR CLUSTERED TRANSFORM COEFFICIENTS IN VIDEO COMPRESSION

(75) Inventors: Wen-hsiung Chen, Sunnyvale, CA (US); Fang Wu, Pleasanton, CA (US); John A. Toebes, Cary, NC (US); Dov Rosenfeld, Oakland, CA (US); Gregory D. Pelton, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/041,376

(22) Filed: Mar. 5, 2011

(65) Prior Publication Data

US 2011/0150352 A1    Jun. 23, 2011

Related U.S. Application Data

(60) Division of application No. 12/626,409, filed on Nov. 25, 2009, now Pat. No. 7,912,306, which is a division of application No. 11/385,183, filed on Mar. 20, 2006, now Pat. No. 7,680,349, which is a continuation-in-part of application No. PCT/US2005/020110, filed on Jun. 8, 2005, and a continuation-in-part of application No. 10/922,508, filed on Aug. 18, 2004, now Pat. No. 7,471,840, and a continuation-in-part of application No. 10/922,507, filed on Aug. 18, 2004, now Pat. No. 7,492,956, and a continuation-in-part of application No. 11/069,622, filed on Feb. 28, 2005, now Pat. No. 7,499,596, and a continuation-in-part of application No. 11/069,621, filed on Feb. 28, 2005, now Pat. No. 7,499,595.

(51) Int. Cl.
*G06K 9/36* (2006.01)

(52) U.S. Cl. ........................................ 382/246; 382/245
(58) Field of Classification Search .................. 382/246, 382/245
See application file for complete search history.

(56) References Cited

U.S. PATENT DOCUMENTS

| 4,420,771 A | 12/1983 | Pirsch |
| 4,698,672 A | 10/1987 | Chen et al. ............... 358/136 |
| 4,706,265 A | 11/1987 | Furukawa ................. 375/122 |
| 4,813,056 A | 3/1989 | Fedele ....................... 375/27 |
| 4,821,119 A | 4/1989 | Gharavi ................. 375/240.16 |

(Continued)

FOREIGN PATENT DOCUMENTS

EP           0 266 049 A2     5/1988

(Continued)

OTHER PUBLICATIONS

Supplementary European Search Report on EPO Application 05759253.7 mailed May 4, 2011.

(Continued)

*Primary Examiner* — Wengpeng Chen
(74) *Attorney, Agent, or Firm* — Dov Rosenfeld; Inventek

(57) ABSTRACT

Coding quantized transform coefficients as occur in image compression combines a position identifying method to identify the relative position of clusters of consecutive non-zero-valued coefficients, an amplitude event identifying method to identify amplitude events in the clusters of non-zero-valued coefficients, and a coding method to code the position events, amplitude events, and signs of the amplitudes in the clusters. The method is particularly applicable to a series of quantized transform coefficients where clusters are likely-to-occur.

23 Claims, 8 Drawing Sheets

U.S. PATENT DOCUMENTS

| | | | |
|---|---|---|---|
| 4,845,560 A | 7/1989 | Kondo et al. | 358/133 |
| 4,858,017 A | 8/1989 | Torbey | 358/426 |
| 4,920,426 A | 4/1990 | Hatori et al. | 358/433 |
| 4,922,510 A | 5/1990 | Brusewitz | 375/122 |
| 4,937,573 A | 6/1990 | Silvio et al. | 341/67 |
| 4,985,700 A | 1/1991 | Mikami | 341/59 |
| 4,985,766 A | 1/1991 | Morrison et al. | 358/133 |
| 5,006,930 A | 4/1991 | Stroppiana et al. | 358/133 |
| 5,045,938 A | 9/1991 | Sugiyama | 358/133 |
| 5,062,152 A | 10/1991 | Faulkner | 359/185 |
| 5,086,488 A | 2/1992 | Kato et al. | 382/56 |
| 5,128,758 A | 7/1992 | Azadegan et al. | 358/133 |
| 5,136,376 A | 8/1992 | Yagasaki et al. | 358/133 |
| 5,162,795 A | 11/1992 | Shirota | 341/67 |
| 5,166,684 A | 11/1992 | Juri et al. | 341/67 |
| 5,179,442 A | 1/1993 | Azadegan et al. | 358/133 |
| 5,226,082 A | 7/1993 | Kustka | 380/46 |
| 5,253,053 A | 10/1993 | Chu et al. | 358/133 |
| 5,253,055 A | 10/1993 | Civanlar et al. | 358/133 |
| 5,291,282 A | 3/1994 | Nakagawa et al. | 348/384 |
| 5,298,991 A | 3/1994 | Yagasaki et al. | 348/416 |
| 5,301,032 A | 4/1994 | Hong et al. | 358/261.2 |
| 5,307,163 A | 4/1994 | Hatano et al. | 348/415 |
| 5,319,457 A | 6/1994 | Nakahashi et al. | 348/387 |
| 5,337,087 A | 8/1994 | Mishima | 348/405 |
| 5,363,097 A | 11/1994 | Jan | 341/67 |
| 5,371,811 A | 12/1994 | Morrison et al. | 382/56 |
| 5,400,075 A | 3/1995 | Savatier | 348/384 |
| 5,402,244 A | 3/1995 | Kim | 358/261.2 |
| 5,446,744 A | 8/1995 | Nagasawa et al. | 371/37.4 |
| RE35,093 E | 11/1995 | Wang et al. | 348/413 |
| 5,475,501 A | 12/1995 | Yagasaki | 358/426 |
| 5,479,527 A | 12/1995 | Chen | 382/232 |
| 5,488,367 A | 1/1996 | Kitamura | 341/106 |
| 5,488,418 A | 1/1996 | Mishima et al. | 348/398 |
| 5,488,616 A | 1/1996 | Takishima et al. | 371/30 |
| 5,491,480 A | 2/1996 | Jan et al. | 341/67 |
| 5,528,628 A | 6/1996 | Park et al. | 375/240 |
| 5,539,401 A | 7/1996 | Kumaki et al. | 341/67 |
| 5,640,420 A | 6/1997 | Jung | 375/240 |
| 5,642,115 A | 6/1997 | Chen | 341/67 |
| 5,644,305 A | 7/1997 | Inoue et al. | 341/67 |
| 5,648,774 A | 7/1997 | Hsieh | 341/67 |
| 5,650,782 A | 7/1997 | Kim | 341/67 |
| 5,696,558 A | 12/1997 | Tsukamoto | 348/405 |
| 5,717,394 A | 2/1998 | Schwartz et al. | 341/51 |
| 5,731,836 A | 3/1998 | Lee | 348/402 |
| 5,740,283 A | 4/1998 | Meeker | 382/248 |
| 5,751,232 A | 5/1998 | Inoue et al. | 341/67 |
| 5,767,800 A | 6/1998 | Machida et al. | 341/67 |
| 5,767,908 A | 6/1998 | Choi | 348/403 |
| 5,774,594 A | 6/1998 | Kitamura | 382/239 |
| 5,793,432 A | 8/1998 | Mishima et al. | 348/423 |
| 5,793,897 A | 8/1998 | Jo et al. | 382/246 |
| 5,818,877 A | 10/1998 | Tsai et al. | 375/241 |
| 5,822,463 A | 10/1998 | Yokose et al. | 382/251 |
| 5,832,130 A | 11/1998 | Kim | 382/248 |
| 5,844,508 A | 12/1998 | Murashita et al. | |
| 5,844,611 A | 12/1998 | Hamano et al. | 348/403 |
| 5,852,469 A | 12/1998 | Nagai et al. | 348/384 |
| 5,883,589 A | 3/1999 | Takishima et al. | 341/67 |
| 5,923,813 A | 7/1999 | Okamoto et al. | 386/109 |
| 5,956,153 A | 9/1999 | Hirabayashi | 358/433 |
| 5,982,437 A | 11/1999 | Okazaki et al. | 348/413 |
| 5,999,111 A | 12/1999 | Park et al. | 341/67 |
| 6,014,095 A | 1/2000 | Yokoyama | 341/67 |
| 6,104,754 A | 8/2000 | Chujoh et al. | 375/240 |
| 6,111,914 A | 8/2000 | Bist | 375/240 |
| 6,118,822 A | 9/2000 | Bist | 375/240 |
| 6,140,944 A | 10/2000 | Toyoyama | 341/63 |
| 6,144,322 A | 11/2000 | Sato | 341/67 |
| 6,198,848 B1 | 3/2001 | Honma et al. | 382/232 |
| 6,218,968 B1 | 4/2001 | Smeets et al. | 341/65 |
| 6,229,460 B1 | 5/2001 | Tsai et al. | 341/67 |
| 6,256,064 B1 | 7/2001 | Chujoh et al. | 348/240.23 |
| 6,278,801 B1 | 8/2001 | Boon | 382/246 |
| 6,304,607 B1 | 10/2001 | Talluri et al. | 375/240.27 |
| 6,339,386 B1 | 1/2002 | Cho | 341/67 |
| 6,388,588 B2 | 5/2002 | Kitamura | 341/67 |
| 6,404,929 B1 | 6/2002 | Boon | 382/233 |
| 6,408,029 B1 | 6/2002 | McVeigh et al. | 375/240.13 |
| 6,445,314 B1 | 9/2002 | Zhang et al. | 341/67 |
| 6,445,739 B1 | 9/2002 | Shen et al. | 375/240.03 |
| 6,477,280 B1 | 11/2002 | Malvar | 382/245 |
| 6,771,828 B1 | 8/2004 | Malvar | 382/240 |
| 7,912,306 B2 * | 3/2011 | Chen et al. | 382/246 |
| 2004/0228540 A1 | 11/2004 | Chen et al. | 382/246 |

FOREIGN PATENT DOCUMENTS

| | | |
|---|---|---|
| WO | WO 93/18616 | 9/1993 |
| WO | WO 03/090421 | 10/2003 |

OTHER PUBLICATIONS

Hartung et al: "Improved encoding of DCT coefficients for low bit-rate video coding using multiple VLC tables", Image Processing, 1999. ICIP 99. Kobe, Japan. Oct. 24-28, 1999, IEEE, Piscataway, NO, USA, vol. 2, Oct. 24, 1999, pp. 51-55.

Apostolopoulos et al: "Position-dependent encoding", Proceedings of the International Conference on Acoustics, Speech, and Signal Processing (ICASSP). Speech Processing 1. Adelaide, Apr. 19-22, 1994; vol. v, Apr. 19, 1994, pp. V/573-V/576.

Reed et al: "Efficient coding of DCT coefficients by joint position-dependent encoding", Acoustics, Speech and Signal Processing, 1998. Proceedings of the 1998 IEEE International Conference on Seattle, WA, USA, May 12-15, 1998, New York, NY, USA. vol. 5, May 12, 1998, pp. 2817-2820.

Jeon et al: "Huffman coding of DCT coefficients using dynamic codeword assignment and adaptive codebook sg-] gcti on" Signal Processing. Image Communication, Elsevier Science Publishers, Amsterdam, NL, vol. 12, No. 3, Jun. 1, 1998, pp. 253-262.

Extended European Search Report on EPO Application 06839677.9 mailed Jun. 28, 2011.

Tu et al: "Adaptive runlength coding", International Conference on Image Processing, vol. 2, Sep. 22, 2002, pp. 665-668.

Wurtenberger et al: "A hybrid coding strategy for optimized test data compression", Proceedings International Test Conference, vol. 1, Sep. 30, 2003-Oct. 2, 2003, pp. 451-459.

Cui et al: "A novel VLC based on second-run-level coding and dynamic truncation", Visual Communications and Image Processing, vol. 6077, No. 2, 607726, Jan. 17, 2006-Jan. 19, 2006, pp. 1-9.

G. Cote, B. Erol, M. Gallant, & F. Kossentini, "H.263+: Video Coding at Low Bit Rates" *in IEEE Transactions on Circuits and Systems for Video Technology*, vol. 8, No. 7, Nov. 1998.

T. Chujoh & Y. Kikuchi, "An improved variable length coding", *Joint Video Team (JVT) of ISO/IEC MPEG & ITU-T VCEG*, $2^{nd}$ Meeting: Geneva, CH, Jan. 29-Feb. 1, 2002.

M.Luttrell, J. Wen, H. Yao, and J. Villasen: "Robust Low Bit Rate Wireless Video Communications," Final Report, Project 97-193, University of California MICRO project, available on http://www.ucop.edu/research/micro/97_98/97 193.pdf.

P.N. Tudor, "MPEG-2 Video Compression", IEE J Langham Thompson Prize, *Electronics & Communication Engineering Journal*, Dec. 1995. Available on http://www.bbc.co.uk/rd/pubs/papers/paper_14/paper 14.html.

"H.264/MPEG-4 AVC Video Compression Tutorial", *VideoLocus*, 2002, available on http://www.videolocus.com.

"MPEG-1 Video Codec", pp. 1-8, available on http://www.cmlab.csie.ntu.edu.tw/cml/dsp/training/coding/mpeg1/.

K. Takagi, "Reyersiblity of Code", *Joint Video Team (JVT) of ISO/IEC MPEG & ITU-T VCEG*, $2^{nd}$ Meeting: Geneva, CH, Jan. 29-Feb. 1, 2002.

A. Bist, "An Adaptive Quantization Scheme for H.263++", ITU-Telecommunication Standardization Sector q15a49, Working Party 15/1, Expert's Group on Very Low Bitrate Visual Telephony, Portland, Jun. 24-27, 1997.

Reed, E.C. and Lim, J.S. "Efficient Coding of DCT Coefficients by Joint Position-Dependent Encoding." *Proceedings of the 1998 IEEE International Conference on Acoustics, Speech and Signal Processing*, May 12, 1998, pp. 2817-2820, IEEE, New York, NY.

Cheung, K.M. and Kiely, A. "An Efficient Variable Length Coding Scheme for an IID Source." *Proceedings of the Data Compression Conference*, Mar. 28, 1995, pp. 182-191, IEEE Computer Society Press, Los Alamitos, CA.

Simon, S. and De Vriendt, J. "Progressive Image Transmission with Run-Length Coding." *Journal on Communications*, vol. 45, May 1994, pp. 45-50, Budapest, Hungary.

Jeon, B., Park, J. and Jeong, J. "Huffman Coding of DCT Coefficients Using Dynamic Codeword Assignment and Adaptive Codebook Selection." *Signal Processing Image Communication*, vol. 12, No. 3, Jun. 1, 1998, pp. 253-262, Elsevier Science Publishers, Amsterdam, NL.

Chandra, A. and Chakrabarty, K. "Reduction of SOC Test Data Volume, Scan Power and Testing Time Using Alternating Run-length Codes." *Proceedings of the 39th Design Automation Conference*, Jun. 10, 2002, pp. 673-678, ACM, New York, NY.

Taubman, D.S. "Section 2.4.3: Run-Length Coding." *JPEG2000: Image Compression Fundamentals, Standards, and Practice*, 2002, Kluwer Academic Publishers, Dordrecht, NL.

Golomb, S. "Run-Length Encodings." *IEEE Transactions on Information Theory*, vol. 12, No. 3, Jul. 1966, pp. 399-401.

Gallager, R.G. and Van Voorhis, D.C. "Optimal Source Codes for Geometrically Distributed Integer Alphabets." *IEEE Transactions on Information Theory*, vol. IT-21, No. 2, Mar. 1975, pp. 228-230.

* cited by examiner

| | Length of non-zero-value cluster | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | C(0,1) | C(0,2) | C(0,3) | C(0,4) | C(0,5) | C(0,6) | C(0,7) | C(0,8) | C(0,9) | C(0,10) | C(0,11) | C(0,12) |
| 1 | C(1,1) | C(1,2) | C(1,3) | C(1,4) | C(1,5) | C(1,6) | C(1,7) | C(1,8) | C(1,9) | C(1,10) | C(1,11) | |
| 2 | C(2,1) | C(2,2) | C(2,3) | C(2,4) | C(2,5) | C(2,6) | C(2,7) | C(2,8) | C(2,9) | C(2,10) | | |
| 3 | C(3,1) | C(3,2) | C(3,3) | C(3,4) | C(3,5) | C(3,6) | C(3,7) | C(3,8) | C(3,9) | | | |
| 4 | C(4,1) | C(4,2) | C(4,3) | C(4,4) | C(4,5) | C(4,6) | C(4,7) | C(4,8) | | | | |
| 5 | C(5,1) | C(5,2) | C(5,3) | C(5,4) | C(5,5) | C(5,6) | C(5,7) | | | | | |
| 6 | C(6,1) | C(6,2) | C(6,3) | C(6,4) | C(6,5) | C(6,6) | | | | | | |
| 7 | C(7,1) | C(7,2) | C(7,3) | C(7,4) | C(7,5) | | | | | | | |
| 8 | C(8,1) | C(8,2) | C(8,3) | C(8,4) | | | | | | | | |
| 9 | C(9,1) | C(9,2) | C(9,3) | | | | | | | | | |
| 10 | C(10,1) | C(10,2) | | | | | | | | | | |
| 11 | C(11,1) | | | | | | | | | | | |
| 12 | C(12,0) | | | | | | | | | | | |

Length of preceding zeroes

Codes for events of runs of zeroes and non-zeroes follwed by a zero

VARIABLE LENGTH CODING FOR CLUSTERED TRANSFORM COEFFICIENTS IN VIDEO COMPRESSION

RELATED PATENT APPLICATIONS

The present application is a divisional of U.S. patent application Ser. No. 12/626,409 filed Nov. 25, 2009, now U.S. Pat. No. 7,912,306 titled "VARIABLE LENGTH CODING FOR CLUSTERED TRANSFORM COEFFICIENTS IN VIDEO COMPRESSION."

U.S. patent application Ser. No. 12/626,409 is a divisional of U.S. patent application Ser. No. 11/385,183 filed Mar. 20, 2006, now U.S. Pat. No. 7,680,349, titled "VARIABLE LENGTH CODING FOR CLUSTERED TRANSFORM COEFFICIENTS IN VIDEO COMPRESSION."

U.S. patent application Ser. No. 11/385,183 (U.S. Pat. No. 7,680,349) is a continuation-in-part of, and claims benefit of priority of International Patent Application No. PCT/US2005/020110 filed Jun. 8, 2005, designating the United States, titled "HYBRID VARIABLE LENGTH CODING FOR VIDEO COMPRESSION," and published as International Patent Publication WO 2006001994.

U.S. patent application Ser. No. 11/385,183 (U.S. Pat. No. 7,680,349) is also a continuation-in-part of, and claims benefit of priority of U.S. patent application Ser. No. 10/922,508, filed 18 Aug. 2004 to inventors Toebes, et al., now U.S. Pat. No. 7,471,840, titled "TWO-DIMENSIONAL VARIABLE LENGTH CODING OF RUNS OF ZERO AND NON-ZERO TRANSFORM COEFFICIENTS FOR IMAGE COMPRESSION". The aspects introduced herein that are also disclosed therein are referred to collectively and individually as the "2-D Non-Zero/Zero Cluster VLC Method" herein.

U.S. patent application Ser. No. 11/385,183 (U.S. Pat. No. 7,680,349) is also a continuation-in-part of, and claims benefit of priority of U.S. patent application Ser. No. 10/922,507, filed 18 Aug. 2004 to inventors Chen, et al., now U.S. Pat. No. 7,492,956, titled "VIDEO CODING USING MULTI-DIMENSIONAL AMPLITUDE CODING AND 2-D NON-ZERO/ZERO CLUSTER POSITION CODING,". The aspects introduced herein that are also disclosed therein are referred to collectively and individually as the "Basic Multi-Dimensional Amplitude VLC Method" herein.

U.S. patent application Ser. No. 11/385,183 (U.S. Pat. No. 7,680,349) is also a continuation-in-part of, and claims benefit of priority of U.S. patent application Ser. No. 11/069,622, filed 28 Feb. 2005 to inventors Chen, et al., now U.S. Pat. No. 7,499,596, titled "AMPLITUDE CODING FOR CLUSTERED TRANSFORM COEFFICIENTS,". The aspects introduced herein that are also disclosed therein are referred to collectively and individually as the "Multi-Table Amplitude VLC Method" herein.

U.S. patent application Ser. No. 11/385,183 (U.S. Pat. No. 7,680,349) is also a continuation-in-part of, and claims benefit of priority of U.S. patent application Ser. No. 11/069,621, filed 28 Feb. 2005 to inventors Chen, et al., now U.S. Pat. No. 7,499,595, titled "JOINT AMPLITUDE AND POSITION CODING FOR PHOTOGRAPHIC IMAGE AND VIDEO CODING,". The aspects introduced herein that are also disclosed therein are referred to collectively and individually as the "Joint Position and Amplitude VLC Method" herein.

International Patent Application No. PCT/US2005/020110 claims benefit of priority of the following eight U.S. patent applications:

U.S. patent application Ser. No. 10/869,229, filed 15 Jun. 2004 to inventors Chen, et al., published as US 20050276487, now U.S. Pat. No. 7,454,076, titled "A HYBRID VARIABLE LENGTH CODING METHOD FOR LOW BIT RATE VIDEO CODING,". The aspects introduced herein that are also disclosed therein are referred to collectively and individually herein as the "Basic Hybrid VLC Method" herein.

U.S. patent application Ser. No. 10/898,654, filed 22 Jul. 2004 to inventors Chen, et al., published as US 20050276497, now U.S. Pat. No. 7,483,584, titled "EXTENDED HYBRID VARIABLE LENGTH CODING OF TRANSFORM COEFFICIENTS FOR VIDEO COMPRESSION,". The aspects introduced herein that are also disclosed therein are referred to collectively and individually as the "Extended Hybrid VLC Method" herein.

U.S. patent application Ser. No. 10/910,712, filed 3 Aug. 2004 to inventors Chen, et al., published as US 20050276498, now U.S. Pat. No. 7,454,073, titled "VIDEO COMPRESSION USING MULTIPLE VARIABLE LENGTH CODING PROCESSES FOR MULTIPLE CLASSES OF TRANSFORM COEFFICIENT BLOCKS,". The aspects introduced herein that are also disclosed therein are referred to collectively and individually as the "Multiple-Class VLC Method" herein.

U.S. patent application Ser. No. 10/922,508 (U.S. Pat. No. 7,471,840, the "2-D Non-Zero/Zero Cluster VLC Method").

U.S. patent application Ser. No. 10/922,507 (U.S. Pat. No. 7,492,956, the "Basic Multi-Dimensional Amplitude VLC Method").

U.S. patent application Ser. No. 11/069,622 (U.S. Pat. No. 7,499,596, the "Multi-Table Amplitude VLC Method").

U.S. patent application Ser. No. 11/069,621 (U.S. Pat. No. 7,499,595, the "Joint Position and Amplitude VLC Method").

U.S. patent application Ser. No. 11/069,620, filed 28 Feb. 2005 to inventors Wu, et al., published as US 20050276499, now U.S. Pat. No. 7,471,841, titled "ADAPTIVE BREAKPOINT FOR HYBRID VARIABLE LENGTH CODING,". The aspects introduced herein that are also disclosed therein are referred to collectively and individually as the "Adaptive Breakpoint Method" herein.

U.S. patent application Ser. No. 11/069,620 (U.S. Pat. No. 7,471,841, the "Adaptive Breakpoint Method") is a continuation-in-part of, and claims benefit of priority of U.S. patent application Ser. No. 10/898,654 (U.S. Pat. No. 7,483,584, the "Extended Hybrid VLC Method").

U.S. patent application Ser. No. 11/069,621 (U.S. Pat. No. 7,499,595, the "Joint Position and Amplitude VLC Method") is a continuation-in part of, and claims benefit of priority of U.S. patent application Ser. No. 10/922,508 (U.S. Pat. No. 7,471,840, the "2-D Non-Zero/Zero Cluster VLC Method").

U.S. patent application Ser. No. 11/069,621 (U.S. Pat. No. 7,499,595, the "Joint Position and Amplitude VLC Method") also is a continuation-in part of, and claims benefit of priority of U.S. patent application Ser. No. 10/922,507 (U.S. Pat. No. 7,492,956, the "Basic Multi-Dimensional Amplitude VLC Method").

U.S. patent application Ser. No. 11/069,622 (U.S. Pat. No. 7,499,596, the "Multi-Table Amplitude VLC Method") is a continuation-in-part of, and claims benefit of priority of U.S. patent application Ser. No. 10/922,508 (U.S. Pat. No. 7,471, 840,the "2-D Non-Zero/Zero Cluster VLC Method").

U.S. patent application Ser. No. 10/910,712 (U.S. Pat. No. 7,454,073, the "Multiple-Class VLC Method") is a continuation-in-part of, and claims benefit of priority of U.S. patent application Ser. No. 10/898,654 (U.S. Pat. No. 7,483,584, the "Extended Hybrid VLC Method").

U.S. patent application Ser. No. 10/898,654 (U.S. Pat. No. 7,483,584, the "Extended Hybrid VLC Method") is a continuation-in-part of, and claims benefit of priority of U.S. patent application Ser. No. 10/869,229 (U.S. Pat. No. 7,454,076, the "Basic Hybrid VLC Method").

The present invention is also related to U.S. patent application Ser. No. 11/270,138 to Inventors Chen et al., filed Nov. 9, 2005, published as US 2006-0056720, now U.S. Pat. No. 7,620,258 and titled "EXTENDED AMPLITUDE CODING FOR CLUSTERED TRANSFORM COEFFICIENTS,". The aspects introduced herein that are also disclosed therein are referred to collectively and individually as the "Concatenated Clusters VLC Method" herein.

The contents of each of the above-mentioned related patent Applications, except any material incorporated by reference in any of the above-mentioned related patent Applications and not explicitly incorporated by reference in the present disclosure, are incorporated herein by reference for all purposes.

BACKGROUND

Two-dimensional variable length coding (2D-VLC) includes collecting or assuming the statistics of two dimensional block transform coefficient events that are each a run of the most likely-to-occur amplitude, e.g., 0, followed by another amplitude. The coding includes assigning variable length codes, e.g., optimal codes such as Huffman codes or Arithmetic codes, to each event. In the description herein, 0 is assumed to be the most likely-to-occur amplitude. The collecting of or assuming statistics includes tracking the quantized non-zero-valued coefficient amplitudes and the number of zero-valued coefficients preceding the non-zero amplitude, i.e., tracking the runlengths of zeros which precedes any non-zero amplitude along a specified path, e.g., a zigzag scan path for a block of coefficients, e.g., an 8 by 8 or a 16 by 16 coefficient block.

A variable length code such as an optimal code is then assigned to each of the events, with the most likely-to-occur element having the shortest number of bits, and the least occurring event coded using the longest number of bits. Table 1 below shows an example of a 2D-VLC table:

TABLE 1

| | | 2D-VLC codes | | | | | | | |
|---|---|---|---|---|---|---|---|---|---|
| | | Runlength of preceding 0's | | | | | | | |
| | | 0 | 1 | 2 | 3 | 4 | 5 | 6 | .. |
| Coeff. Amp. | 1 | C10 | C11 | C12 | C13 | C14 | C15 | C16 | .. |
| | 2 | C20 | C21 | C22 | C23 | C24 | C25 | C26 | .. |
| | 3 | C30 | C31 | C32 | C33 | C34 | C35 | C36 | .. |
| | 4 | C40 | C41 | C42 | C43 | C44 | C45 | C46 | .. |
| | 5 | C50 | C51 | C52 | C53 | C54 | C55 | C56 | .. |
| | 6 | C60 | C61 | C62 | C63 | C64 | C65 | C66 | .. |
| | 7 | C70 | C71 | C72 | C73 | C74 | C75 | C76 | .. |
| | 8 | C80 | C81 | C82 | C83 | C84 | C85 | C86 | .. |
| | 9 | C90 | C91 | C92 | C93 | C94 | C95 | C96 | .. |
| | . | . | . | . | . | . | . | . | .. |
| | . | . | . | . | . | . | . | . | .. |
| | . | . | . | . | . | . | . | . | .. | where $C_{ij}$ is the codeword used to encode the event of the combination of j consecutive 0-valued coefficients followed by a single non-zero coefficient of amplitude i, j=0, 1, ... and i=1, 2, ....

2D-VLC is used in common transform coding methods such as JPEG, MPEG1, MPEG2, ITU-T-261, etc., as follows. For motion video, an image is divided into blocks, e.g., 8 by 8 or 16 by 16 blocks. Each image is classified as interframe or intraframe. Interframe images are typically post motion compensation. The blocks of the image are transformed and the transform coefficients are quantized. The quantized transform coefficients are then coded along a specified path according to a 2D-VLC table. Typically, interframe and intraframe images have different 2D-VLC tables. The DC component is typically separately encoded. Furthermore, the 2D-VLC table may be truncated so that the least frequently occurring events use an escape code followed by a fixed length code. A special "EOB" code is used to indicate the end of a block when all remaining coefficients are zero.

Still images are similarly encoded, e.g., in the same manner as an intraframe image for motion video.

A table lookup may be used to implement a 2D-VLC scheme. Prior to the table look up, the runlength of zero amplitudes preceding any non-zero amplitude and the non-zero amplitude are determined. The table look up uses a 2D table for those likely events encoded using variable length encoding. An escape code together with a fixed length code is used for relatively less likely-to-occur combinations.

The advantage of 2D-VLC is that both the position of each non-zero-valued coefficient as indicated by the runlength, and the quantized amplitude value are coded simultaneously as a pair using one 2D-VLC table. This may result in shorter codes, i.e., codes that use fewer bits than using separate VLC tables for each non-zero-valued coefficient and for its amplitude.

Because of the widespread use of image coding, many patents have been issued on different forms of VLC. U.S. Pat. No. 4,698,672 issued Oct. 6, 1987 to Wen-hsiung Chen, one of the inventors of the present invention, for example described one form of a two-dimensional variable length coding method.

Extensions and variations to the common 2D-VLC method are known. For example, the ITU H.263 compression standard defines one such variation sometimes called three-dimensional VLC (3D-VLC). See PCT patent publication WO 9318616 published Sep. 16, 1993 titled PICTURE DATA ENCODING METHOD and also the ITU-T H.263 standard. In 3D-VLC, each symbol ("event") is a triplet (LAST, RUN, LEVEL) that includes: LAST, a binary flag that indicates whether or not the current non-zero amplitude-value is the last non-zero coefficient in the block, RUN, the run-length of zero-value coefficients that precede the current non-zero amplitude, i.e., the number of zeroes since the last non-zero coefficient amplitude, and LEVEL, the current non-zero coefficient amplitude value. Thus, there is no need for a separate EOB codeword; whether or not the non-zero coefficient is the last one is incorporated into the event. A table lookup may be used to implement 3D-VLC.

One deficiency of 2D-VLC is that every non-zero-valued coefficient needs to be accompanied by a runlength code to identify its position, in the form of the number of preceding zero-valued coefficients.

In block based transform coding, the inventors have observed that there often is a region along the ordering in which non-zero-valued coefficients tend to cluster, i.e., there are often a number of consecutive non-zero-valued coefficients along the pre-determined path, especially at the beginning This may especially occur in intraframe coding and high bit rate interframe coding. Each one of a number of such consecutive non-zero-valued coefficients would require the same number of codewords representing the position and amplitude. That is, 2D-VLC requires a separate runlength code, e.g., C10, C20, C30 . . . , etc., for each of the consecutive non-zero coefficients.

U.S. patent application Ser. No. 10/342,537 to inventors Chen et al., filed Jan. 15, 2003 and titled AN EXTENSION OF TWO-DIMENSIONAL VARIABLE LENGTH CODING FOR IMAGE COMPRESSION describes a method called the "Extended 2D-VLC Method" herein that includes encoding repetitions of some non-zero coefficient values. One variant of the Extended 2D-VLC method provides codes for all the possible amplitude variations of consecutive coefficients that follow a set of zero-valued coefficients. This effectively reduced the runlength to 1 for all cases. The difficulty of this approach is that there are enormous numbers of patterns that can be generated from the amplitudes of consecutive coefficients. For example, with 32 quantization levels as defined in many common video coding standards, there are in the order of $32^n$ patterns that can be generated from n consecutive coefficients. As such, in a practical implementation, only a limited number of the most likely-to-occur non-zero amplitude values, such as 1 and 2, and a limited number of lengths of consecutive non-zero-values, such as 3 or 4 consecutive values, are regrouped for pattern matching.

The present invention provides coding methods that are appropriate where it is likely that there are clusters of non-zero-valued coefficients.

Many of the techniques described herein were first described in the related patent applications in connection with what we call "hybrid coding." In coding, the inventors observed that not only are there are likely to be clusters of non-zero-valued coefficients, but that in some situations, such clusters are likely-to-occur in less than the whole region, e.g., in a low frequency region along the ordering of the coefficients, and that there is also likely to be a high frequency region where any non-zero-valued coefficients are likely to be scattered. With these observation in mind, the Basic Hybrid VLC Method of above-mentioned incorporated by reference U.S. patent application Ser. No. 10/869,229 to inventors Chen et al. was developed to encode the position and amplitude of quantized transform coefficients separately and takes advantage of the nature of the distribution of the transform coefficients in the low frequency and high frequency regions. Many of the other related patent applications dealt with either extensions of these methods, or with improved techniques for one or another region.

The Extended Hybrid VLC Method of incorporated by reference U.S. patent application Ser. No. 10/898,654 provides an alternative coding method for the high frequency region by taking advantage of the very few amplitude values in the high frequency region, especially, for example, for low bit rate and interframe applications.

In one embodiment of the above-mentioned Basic Hybrid VLC Method, two independent types of coding schemes are introduced to code the quantized coefficients along the path. A boundary is established along the path to define two regions, e.g., a low frequency region and a high frequency region. The boundary can be made adaptive to the video depending on a number of factors such as intraframe coding or interframe coding, standard definition television (SDTV) or high definition television (HDTV), complex scene or simple scene, high bit rate coding or low bit rate coding, and so forth. In one embodiment, the encoding of the quantized coefficients in the low-frequency region includes coding the positions of consecutive non-zero-valued coefficients and the positions of consecutive zero-valued coefficients using a run-length coding method of a first type and a run-length coding method of a second type. The encoding further includes coding the amplitude values and sign of the non-zero-valued coefficients. In the high-frequency region, in one embodiment, the encoding of coefficients in the high frequency region includes encoding the positions of either no consecutive zero-valued coefficients or runs of one or more consecutive zero-valued coefficients using a run-length coding method of a third type. The encoding further includes coding the amplitude values and sign of the non-zero-valued coefficients.

In one embodiment of the above-mentioned Extended Hybrid VLC Method, a coding method is used in the second region that takes into account that almost all non-zero-valued coefficients in the high frequency region are ±1. No amplitude coding is needed to encode runs of consecutive zeroes that end in a coefficient of amplitude 1. An exception (escape) code is included to encode those rare non-zero-valued coefficients that have values other than ±1.

In addition to hybrid coding, there also is a need in the art for coding when the whole region is the region where clusters are likely-to-occur, or where it is not appropriate to use two different coding methods.

SUMMARY

Described herein are a method, a computer-readable storage medium configured with computer-readable instructions such as a computer program, the code to instruct a processor to execute the method, and an apparatus applicable for coding a series quantized transform coefficients as occur in image compression. Described herein also is a computer-readable storage medium configured with codewords that are generated by the coding methods described herein.

The method is applicable for coding an ordered series of quantized coefficients of a transform of image data, e.g., a block of image data.

One embodiment is a method of processing an ordered series of digital signals that each have an amplitude from a finite set of amplitudes consisting of the most likely-to-occur amplitude and at least one other amplitude, the at least one other amplitude including a next most likely-to-occur amplitude to the most likely-to-occur amplitude. The processing is to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords.

An aspect of the present invention includes a position coding method to code the position of clusters of consecutive non-zero-valued coefficients and an amplitude coding method to code the amplitudes of coefficients in the clusters of non-zero-valued coefficients.

According to one aspect of the invention, the method includes:
 a) using a position event identifying method to identify position events that each include a cluster of at least one consecutive signal having any amplitude other than the most likely-to-occur amplitude, such that the position events define the relative positions and runlengths of the clusters and of any intervening runs of consecutive coefficients having the most likely-to-occur amplitude;
 b) using an amplitude event identifying method to identify the amplitudes of the signals having amplitudes other than the most likely-to-occur amplitude; and
 c) encoding the identified position events, encoding the identified amplitude events, and encoding the signs of the amplitudes other than the most likely-to-occur amplitude in the identified amplitude events, such that for at least some of the signals having amplitudes other than the most likely-to-occur amplitude, clusters of signals having relatively more likely-to-occur signal amplitudes are encoded on average by shorter codeword(s) than are clusters of signals having relatively less likely-to-occur signal amplitudes.

The position event identifying method is in one embodiment, a first position event identifying method, called "Cluster Runlength Identifying" herein, which is the same as the first region position identifying of the Basic Hybrid VLC Method and, in another embodiment, a second position event identifying method, called "2-D Cluster Length and Position Identifying" herein which is the same as the first region position identifying of the 2-D Non-Zero/Zero Cluster VLC Method. That is, the first position event identifying method using Cluster Runlength Identifying includes identifying events of the first kind, each event of the first run including a run of consecutive signals of amplitude or amplitudes other than the most likely-to-occur amplitude; and identifying events of the second kind, each event of the second kind being a run of consecutive signals of the most likely-to-occur amplitude. The second position event identifying method using 2-D Cluster Length and Position Identifying includes identifying position events that each includes a run of consecutive signals of the most likely-to-occur amplitude, preceding a run of one or more consecutive signals having any value other than the most likely-to-occur amplitude, including events of no coefficients of the most likely-to-occur amplitude preceding a run of one or more consecutive coefficients having other than the most likely-to-occur amplitude.

In embodiments that use the first position event identifying method, the amplitude event identifying method uses, in some embodiments, a first amplitude event identifying method includes what we call "Multi-Dimensional Amplitude Event Identifying" herein, includes the first region amplitude event identifying described in the Basic Multi-Dimensional Amplitude VLC Method, and, in other embodiments, a second amplitude event identifying method includes what we call "Multi-Table Amplitude Event Identifying" herein, includes the amplitude event identifying method described in the Multi-Table Amplitude VLC Method. In embodiments that use the second position event identifying method, the amplitude event identifying method uses Multi-Dimensional Amplitude Event Identifying in some embodiments, Multi-Table Amplitude Event Identifying in other embodiments, and a third amplitude event identifying method that includes identifying single amplitudes in yet other embodiments.

Multi-Dimensional Amplitude Event Identifying, includes identifying amplitude events that include a run of consecutive signals of amplitude or amplitudes other than the most likely-to-occur amplitude. Multi-Table Amplitude Event Identifying includes in each run of consecutive signals of value or values having other than the most likely-to-occur amplitude, identifying amplitude events of at least one consecutive signal, an identified amplitude event including a sequence of at least one consecutive signal having the next most likely-to-occur amplitude that ends in a signal having other than the next most likely-to-occur amplitude, or ascertaining that the amplitude event has only a signal having other than the next most likely-to-occur amplitude, or ascertaining that the amplitude event has only a sequence of consecutive signals having the next most likely-to-occur amplitude, each identified amplitude event defined by the length of the run of consecutive signals of amplitude value or values other than the most likely-to-occur amplitude, the length of the sequence of at least one consecutive signal having the next most likely-to-occur amplitude, and by the amplitude of the ending signal. The third amplitude event identifying method includes in each run of consecutive signals of value or values having other than the most likely-to-occur amplitude, identifying amplitude events of a single signal having other than the most likely-to-occur amplitude.

The encoding of the identified position and amplitude events includes, depending on the embodiment, one of:
jointly encoding the identified position events together with the identified amplitude events as in the Joint Position and Amplitude VLC Method, or
separately encoding the identified position events and identified amplitude events.

In the case of separately encoding the identified position events and identified amplitude events, coding the position events for the first position event identifying method includes forming codewords for the events of the first kind, including encoding the runlength of the consecutive signals using a first runlength coding method, and forming a codeword that encodes the runlength using the first runlength coding method, such that for at least some events of the first kind, relatively more likely-to-occur runlengths are encoded by a shorter codeword than relatively less likely-to-occur runlengths, and forming codewords for the events of the second kind, including encoding the runlength of the consecutive signals of the most likely-to-occur amplitude using a second runlength coding method, such that for at least some events of the second kind, relatively more likely-to-occur pairs of runlengths are encoded by a shorter codeword than relatively less likely-to-occur runlengths.

Also in the embodiments that include separately encoding the identified position events and identified amplitude events, coding the position events for the second position event identifying method includes for each identified position event, jointly encoding the run lengths of the preceding run of the most likely-to-occur amplitude and the following run of other than the most likely-to-occur amplitude with a codeword, such that for at least some events, relatively more likely-to-occur pairs of runlengths are encoded by a shorter codeword than relatively less likely-to-occur runlengths.

Coding the amplitude events for the first amplitude event identifying method includes jointly encoding a plurality of consecutive values in the run of consecutive signals having other than the most likely-to-occur amplitude, the joint encoding according to a joint amplitude coding method, such that relatively short codewords are formed to represent values or sequences of values that are relatively more likely-to-occur, and relatively long codewords are formed to represent values or sequences of values that are relatively less likely-to-occur.

Coding the amplitude events for the second amplitude event identifying method includes encoding each identified amplitude event by at least one codeword such that for at least some identified amplitude events, relatively more likely-to-occur amplitude events are encoded by a shorter codeword than relatively less likely-to-occur amplitude events.

Coding the amplitude events for the third amplitude event identifying method includes encoding each identified amplitude event by a codeword such that for at least some identified amplitude events, relatively more likely-to-occur amplitude events are encoded by a shorter codeword than relatively less likely-to-occur amplitude events.

In the case of jointly encoding the identified position events and identified amplitude events, coding the position events includes jointly encoding the identified position events and the identified amplitude events to jointly encode relative position and the amplitudes of the consecutive signals having amplitude other than the most likely-to-occur amplitude, such that the jointly encoding of the run lengths in the second position coding method is included in the jointly encoding of the identified position and amplitude events, the jointly encoding of the identified position and amplitude events, being according to a multi-dimensional coding function of the position event and of the amplitude event, the jointly encoding arranged such that relatively short codewords are used to represent the relative positions and amplitudes of clusters that are more likely-to-occur, and relatively long codewords are used to represent the relative positions and amplitudes of clusters that are relatively less likely-to-occur.

According to another aspect, also provided herein is a computer-readable storage medium configured with instructions that when executed by at least one processor of a processing system cause the processing system to carry out a method for processing an ordered series of digital signals that each have an amplitude from a finite set of amplitudes consisting of the most likely-to-occur amplitude and at least one other amplitude, the at least one other amplitude including a next most likely-to-occur amplitude to the most likely-to-occur amplitude, the processing to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords. The method is as described in the paragraphs above.

According to another aspect, also provided herein is an apparatus for processing an ordered series of digital signals that each have an amplitude from a finite set of amplitudes consisting of the most likely-to-occur amplitude and at least one other amplitude, the at least one other amplitude including a next most likely-to-occur amplitude to the most likely-to-occur amplitude, the processing to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords.

The apparatus includes:
(a) means for using the position event identifying method described in the above paragraphs to identify position events that each include a cluster of at least one consecutive signal having any amplitude other than the most likely-to-occur amplitude, such that the position events define the relative positions and runlengths of the clusters and of any intervening runs of consecutive coefficients having the most likely-to-occur amplitude;
(b) means for using the amplitude event identifying method described in the above paragraphs to identify the amplitudes of the signals having amplitudes other than the most likely-to-occur amplitude; and
(c) means for encoding the identified position events, for encoding the identified amplitude events, and for encoding the signs of the amplitudes other than the most likely-to-occur amplitude in the identified amplitude events, such that for at least some of the signals having amplitudes other than the most likely-to-occur amplitude, clusters of signals having relatively more likely-to-occur signal amplitudes are encoded on average by shorter codeword(s) than are clusters of signals having relatively less likely-to-occur signal amplitudes.

The means for encoding of the identified position and for encoding of the amplitude events includes one of:
means for jointly encoding the identified position events together with the identified amplitude events as in the Joint Position and Amplitude VLC Method, or
means for separately encoding the identified position events and identified amplitude events.

The means for jointly encoding uses the jointly encoding method described in the Joint Position and Amplitude VLC Method.

The means for separately encoding includes means for coding the position events and means for coding the amplitude events. In the case of the first position event identifying method being used, the means for coding the position events includes means for forming codewords for the events of the first kind, including encoding the runlength of the consecutive signals using a first runlength coding method, and means for forming codewords for the events of the second kind In the case of the second position event identifying method, the means for coding the position events includes means for jointly encoding the runlengths of the preceding run of the most likely-to-occur amplitude and the following run of other than the most likely-to-occur amplitude with a codeword, such that for at least some events, relatively more likely-to-occur pairs of runlengths are encoded by a shorter codeword than relatively less likely-to-occur runlengths.

The means for coding the amplitude events for the first amplitude event identifying method includes means for jointly encoding a plurality of consecutive values in the run of consecutive signals having other than the most likely-to-occur amplitude, the joint encoding according to a joint amplitude coding method, such that relatively short codewords are formed to represent values or sequences of values that are relatively more likely-to-occur, and relatively long codewords are formed to represent values or sequences of values that are relatively less likely-to-occur.

The means for coding the amplitude events for the second amplitude event identifying method includes means for encoding each identified amplitude event by at least one codeword such that for at least some identified amplitude events, relatively more likely-to-occur amplitude events are encoded by a shorter codeword than relatively less likely-to-occur amplitude events.

The means for coding the amplitude events for the third amplitude event identifying method includes means for encoding each identified amplitude event by a codeword such that for at least some identified amplitude events, relatively more likely-to-occur amplitude events are encoded by a shorter codeword than relatively less likely-to-occur amplitude events.

In some embodiments, the series of digital signals is a series of quantized coefficients of a transformed block of image data, the transform such that the most likely-to-occur amplitude is 0, and the next most likely-to-occur amplitude is 1, such that the identifying of position events identifies events that include a cluster of one or more non-zero-valued coefficients.

Other aspects, features, advantages, and details are described in the description herein, and in the claims

BRIEF DESCRIPTION OF THE DRAWINGS

FIG. 4 shows a code table for the positions of zeroes and clusters of non-zero coefficients using an embodiment of the 2-D Non-Zero/Zero Cluster VLC Method used in some embodiments of the invention.

FIG. 6 shows a set of 2-D code tables for the events within a cluster of n non-zero coefficients, each event being a runlength of preceding amplitude 1 coefficients for the runlength=0, 1, ..., n−1, followed by the final amplitude larger than 1, for using the Multi-Table Amplitude VLC Method in one embodiment of the invention.

DETAILED DESCRIPTION

Described herein are a method, a computer-readable storage medium configured with instructions (a program) to cause a processor to execute the method, and an apparatus applicable for coding quantized transform coefficients as occur in image compression. The method is aimed at efficiently encoding quantized transform coefficients as occur in image compression.

While the description is written in terms of an ordered series of digital values that are quantized transform coefficients of a block of image data, with zero-valued quantized coefficients being the most likely-to-occur, and quantized coefficients of value±1 being the next most likely-to-occur amplitudes, the invention is, in general, applicable to an ordered series of digital signals that each have an amplitude from a finite set of amplitudes consisting of the most likely-to-occur amplitude and at least one other amplitude. How to modify any aspect of the invention described herein for the case of a series where a value other than 0 is the most likely-to-occur amplitude or amplitude would be straightforward to those in the art.

An aspect of the present invention includes a position event identifying method to identify the relative position of consecutive non-zero-valued coefficients that occur in runs of non-zero-valued coefficients ("clusters"), an amplitude event identifying method to identify amplitude events regarding the non-zero-valued coefficients in the clusters, and one or ore coding methods to encode the identified position events and identified amplitude events to produce codewords for coding an ordered series of quantized coefficients of a transform of image data in the series. Such a series occurs in many image compression methods.

One embodiment includes separately coding the identified position events with a position event coding method that produces the code for the positioning that indicates the relative position of each cluster of non-zero-valued coefficients. Another embodiment includes jointly coding the identified position events and the identified amplitude events to produce combined codeword.

Note the term "none or more" or "zero or more" is used herein for runlengths, a run of consecutive coefficients of a particular value, that precedes a coefficient of some other amplitude value. Such a term "none or more" or "zero or more" is common in computer science, and means: the length of a run of one or more consecutive coefficients of the particular value if there are any immediately preceding coefficients of the particular amplitude value, or a length of 0 if there are no immediately preceding coefficients of the particular amplitude value.

Figure 1:
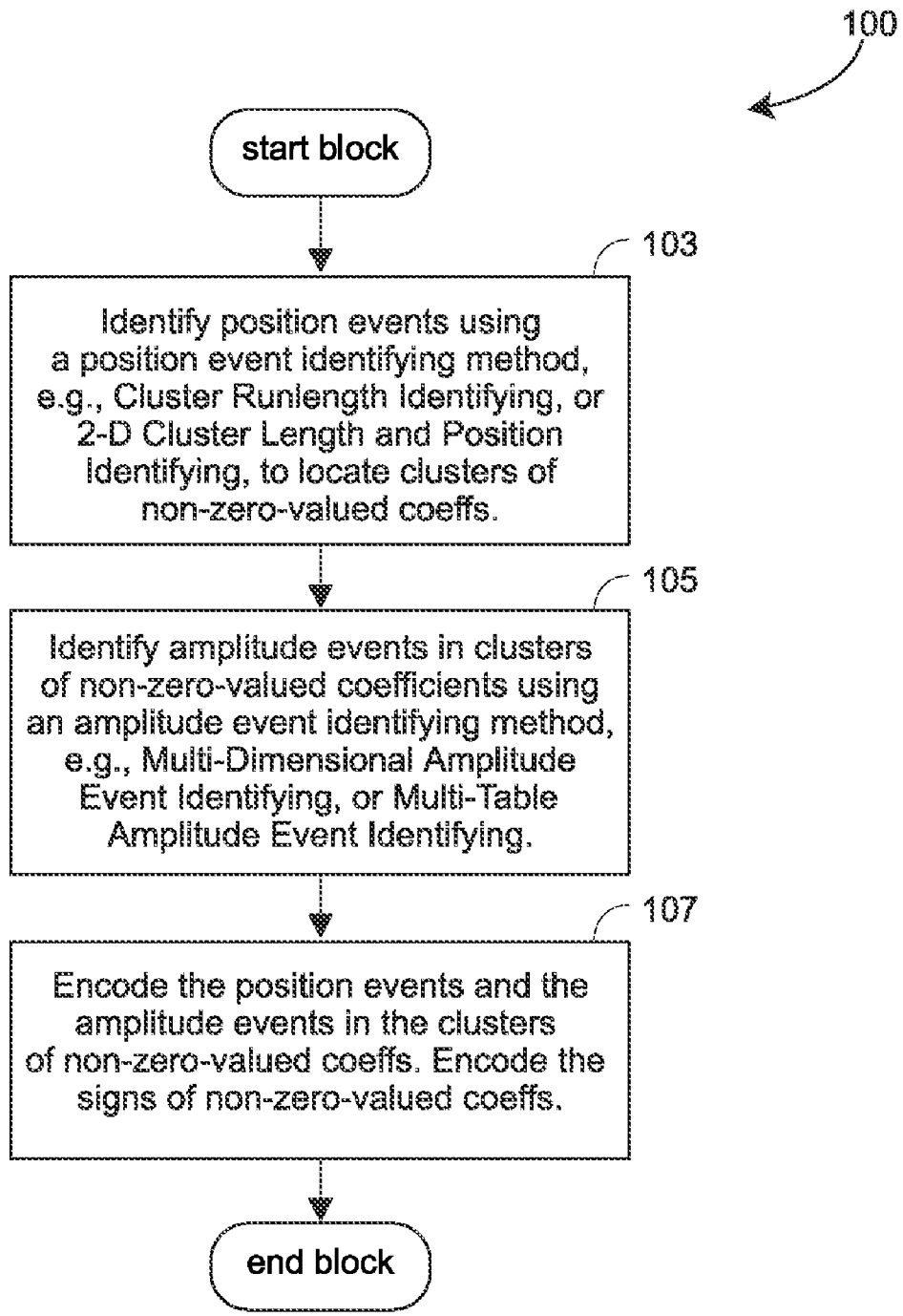
FIG. 1 shows a flow chart of one embodiment of a hybrid variable length coding (VLC) method that includes coding the positions and length of clusters of non-zero coefficients and of zero-valued coefficients, and further that includes coding the amplitudes of the coefficients in the clusters of non-zero-valued coefficients.

FIG. 1 shows a flow chart of one embodiment of a variable length coding (VLC) method 100 that is applicable to all the coefficients in the series, typically excluding the DC coefficient.

103 includes using a position event identifying method to identify position events that provide the location of runs of one or more consecutive non-zero-valued coefficients (called "clusters") in the series. These position events are encoded in 107 either separately, or jointly with position events (see below).

Cluster Runlength Identifying

Some embodiments of 103 use a first position event identifying method that is described in the Basic Hybrid VLC Method and the Extended Hybrid VLC Method as suitable for a first region in those VLC methods, that is called the Cluster Runlength Identifying herein, and is as described for a first region in the Basic Hybrid VLC Method and the Extended Hybrid VLC Method, and includes identifying events of the first kind, each event of the first run including a run of consecutive non-zero-valued coefficients, and identifying events of the second kind, each event of the second kind being a run of consecutive zero-valued coefficients.

2-D Cluster Length and Position Identifying

Other embodiments of 103 use a second position event identifying method that is as described in the 2-D Non-Zero/Zero Cluster VLC Method for a first region in that VLC method, that is called the 2-D cluster length and position identifying method herein, and that includes identifying position events that each includes a run of none or more consecutive zero-valued coefficients preceding a run of one or more consecutive non-zero-valued coefficients. The event is identified by the runlengths of the preceding zero-valued coefficients, including a runlength of 0, and the runlength of the consecutive non-zero-valued coefficients. In some embodiments, a single zero-valued coefficient that follows the one or more non-zero-valued coefficients in included in the identified position event. The inventors observed that an improvement in coding efficiency often can be achieved by so pairing the consecutive non-zero-valued coefficients and zero-valued coefficients as a pair and applying a single two-dimensional table to code the pair (see 107 below).

Referring again to FIG. 1, in 105, an amplitude event identifying method is applied to identify amplitude events in the clusters of non-zero-valued coefficients.

Multi-Dimensional Amplitude Event Identifying

In the case 103 uses Cluster Runlength Identifying, in one embodiment, the amplitude event identifying method of 105 uses what we call Multi-Dimensional Amplitude Event Identifying herein, and includes an embodiment of the amplitude event identifying method described for the first region in the Basic Multi-Dimensional Amplitude VLC Method.

Multi-Table Amplitude Event Identifying

In another embodiment in which Cluster Runlength Identifying is used, the amplitude event identifying method is described for the first region in the Multi-Table Amplitude VLC Method, and is called Multi-Table Amplitude Event Identifying herein.

In the case of 103 using 2-D Cluster Length and Position Identifying, the amplitude event identifying method of 105 uses, in one embodiment, Multi-Dimensional Amplitude Event Identifying. In another embodiment, Multi-Table Amplitude Event Identifying is used. In yet another embodiment, a third amplitude event identifying is used, e.g., recognizing individual amplitudes.

107 includes for the series, encoding the identified position events, encoding the identified amplitude events, and encoding the signs of the non-zero amplitudes in the identified amplitude events, such that for at least some of the non-zero-valued coefficients, clusters of coefficients having relatively more likely-to-occur amplitudes are encoded on average by shorter codeword(s) than are clusters having relatively less likely-to-occur amplitudes.

Different embodiments of 107 use different methods. Some use a joint coding method that jointly encodes the position and amplitude events, while other embodiments use a separate position event coding method and a separate amplitude event coding method appropriate for the event identifying methods.

Consider now embodiments that, in 107, include separately encoding the identified position events and the identified amplitude events.

Figure 2:
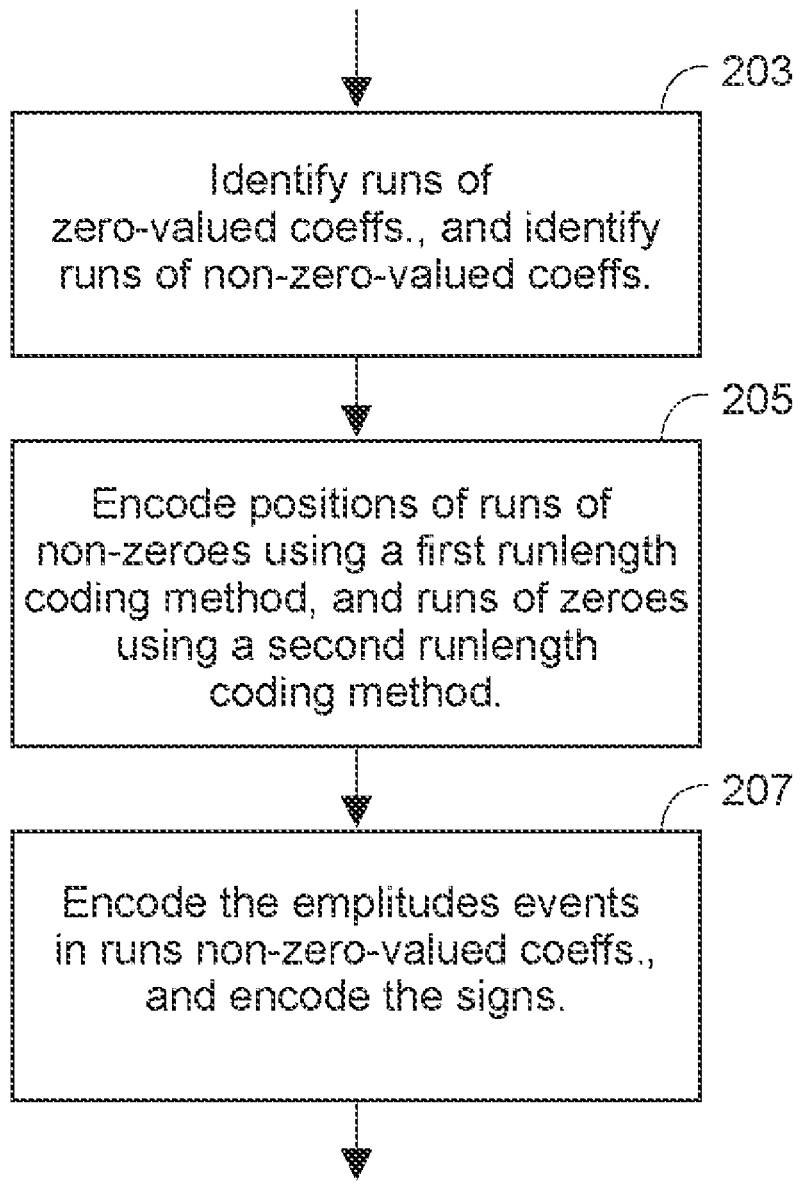
FIG. 2 shows a simplified flow-chart part for the embodiments that use the first position event identifying method—Basic Hybrid VLC Method and the Extended Hybrid VLC Method, and separately encoding amplitude events.

FIG. 2 shows a simplified flow-chart part for the embodiments that use Cluster Runlength Identifying, and separately encode amplitude events. Identifying the events of the first and second kinds is shown in 203. 205 includes encoding each of the events of the first kind and the events of the second kind.

In 207, the amplitudes in each run of non-zero-amplitudes in the identified event of the first is encoded using an amplitude code. Different embodiments use different amplitude coding methods as described further below depending on the amplitude event identifying method that was used. 207 also includes encoding the signs.

Figure 3:
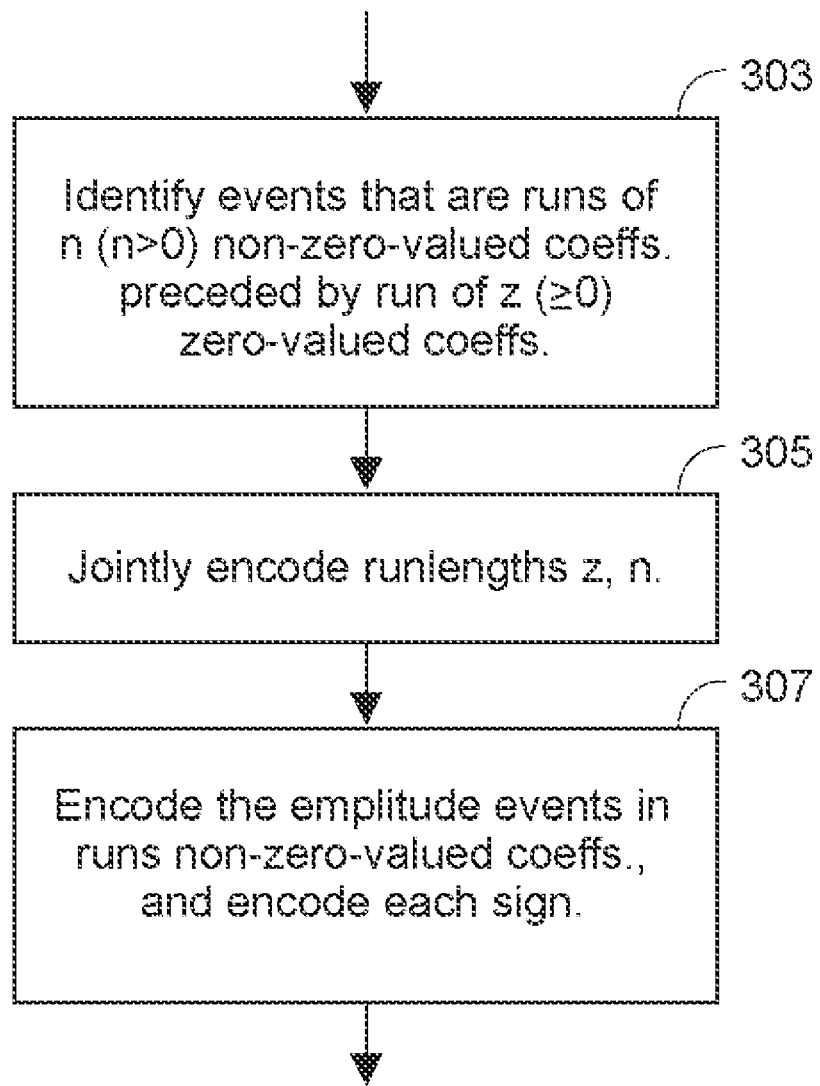
FIG. 3 shows a simplified flow-chart part for the embodiments that use the second position event identifying method—the 2-D Non-Zero/Zero Cluster VLC Method, and separately encoding amplitude events.

FIG. 3 shows a simplified flow-chart part for the embodiments that use 2-D Cluster Length and Position Identifying, and that separately encode amplitude events. Identifying the events is shown in 303. In 305, the encoding uses joint encoding for each event of the runlength (including a possible runlength of 0) of the preceding none-or-more zero-valued coefficients and the runlength of the following one or more non-zero-valued coefficients. In one embodiment using 2-D Cluster Length and Position Identifying, 305 includes using a two-dimensional lookup table of codes. The codes include variable length codes determined using assumed or actual statistics. Thus, for at least some events, relatively more likely-to-occur pairs of runlengths are encoded by a shorter codeword than relatively less likely-to-occur runlengths.

In 307, the amplitudes in each run of non-zero-amplitudes in the identified event of the first is encoded using an amplitude code. Different embodiments use different amplitude coding methods as described further below and according to the amplitude event identifying method used. 307 also includes encoding the signs.

FIG. 4 shows a code table for the positions of zeroes and clusters of non-zero coefficients using an embodiment of 2-D Cluster Length and Position Identifying used in some embodiments of the invention. Note that fixed length codes are used for some less likely position events.

In one embodiment that uses 2-D Cluster Length and Position Identifying, each amplitude is separately encoded, e.g., using a variable length code obtained using a code table.

As an example, consider the position coding (103 and 105 of FIG. 1) using Cluster Runlength Identifying. Denote by r(n) an identified run of n consecutive non-zero coefficients, and r'(z) an identified run of z consecutive zero-valued coefficients, $n,z=1, 2, \ldots$. Consider a single event denoted by r(n), denote each of the non-zero amplitudes in r(n) by m(1), m(2), ..., m(n). Denote by C(n) the variable length codeword for the runlength of non-zero-valued coefficients in the event r(n), $n=1, 2, \ldots$ and C'(z) the variable length codeword for the runlength of zero-valued coefficients in the event r'(z), $z=1, 2, \ldots$. Denote by A(a) the amplitude encoding of an amplitude a, $a=1, 2, \ldots$, in the run r(n) of non-zero-valued coefficients; and denote by S(1), S(s), ..., the sign bits for the first, second, ..., n'th non-zero-valued coefficient in r(n). Then according to embodiments that use Cluster Runlength Identifying, the encoding of the event and the corresponding non-zero amplitudes is:

$$C(n)+A(m(1))+S(1)+A(m(2))+S(2)+ \ldots +A(m(n))+S(n)+C'(z),$$

where+denoted concatenation.

As another example, suppose a pair of "z" consecutive zero-valued coefficients and "n" consecutive non-zero-valued coefficients, followed by a single non-zero-value, is coded in 105 using the coding invention described in the 2-D Non-Zero/Zero Cluster VLC Method. Denote the positions of the zero-valued/non-zero valued coefficients by R(z,n) and denote each of the amplitudes by m(1), m(2), ..., m(n). Denote by C(z,n) the variable length codeword for the event R(z,n), $z=0, 1, \ldots, n=1, 2, \ldots$; denote by A(a) the amplitude encoding of an amplitude a, $a=1, 2, \ldots$, in the run of non-zero-valued coefficients in R(z,n); and denote by S(1), S(2), ..., the sign bits for the first, second, ..., n'th non-zero-valued coefficient in R(z,n). Then, according to one embodiment that uses 2-D Cluster Length and Position Identifying, the encoding of the event and the corresponding non-zero amplitudes is:

$$C(z,n)+A(m(1))+S(1)+A(m(2))+S(2)+ \ldots +A(m(n))+S(n),$$

where+denoted concatenation.

Multi-Dimensional Amplitude Event Coding

The inventors have noticed that encoding the amplitudes takes up a significant part of the code in VLC coding of clusters of non-zero-valued coefficients. With this in mind, the inventors observed that, at least in theory, an improvement in amplitude code can be achieved by introducing a single multi-dimensional code, say an N-dimensional code, N an integer greater than 1, to encode N clustered non-zero coefficients, instead of using N separate one dimensional codes. The Basic Multi-Dimensional Amplitude VLC Method of above-mentioned incorporated-by-reference U.S. patent application Ser. No. 10/922,507 includes such multidimensional amplitude coding, and uses Multi-dimensional Amplitude Event Identifying. Thus, 207 of FIG. 2 or 307 of FIG. 3 can use an aspect of the Basic Multi-Dimensional Amplitude VLC Method that includes Multi-dimensional Amplitude Event Identifying, e.g., identifying events that each includes a run of one or more non-zero-valued coefficients, and for each such identified event, carrying out what we call "Multi-Dimensional Amplitude Event Coding," which includes encoding the event with a codeword such that for at least some events, relatively more likely-to-occur events are encoded by a shorter codeword than relatively less likely-to-occur events, and for each identified event, jointly encoding a plurality of consecutive values in the run of consecutive non-zero-valued coefficients, the joint encoding according to an amplitude coding method. The method is such that relatively short codewords are formed to represent values or sequences of values that are relatively more likely-to-occur, and relatively long codewords are formed to represent values or sequences of values that are relatively less likely-to-occur. The method is particularly applicable to encoding a series where there is likely to be one or more clusters of non-zero-valued coefficients.

Thus, one version of 207 or 307 uses a single codeword obtained by Multi-Dimensional Amplitude Event Coding to encode the sequence of amplitudes A(m(1)), A(m(2)), . . . , A(m(n)) by a variable length codeword. The codeword can be obtained by a multi-dimensional coding table, obtained using assumed or measured statistics. For example, denote by $A_n$(m(1), m(2), . . . , m(n)) the codeword for the sequence of n quantized amplitudes m(1), m(2), . . . , m(n), n=1, 2, . . . . According to one embodiment of the Basic Multi-Dimensional Amplitude VLC Method, the event R(z,n) and associated amplitudes and signs is encoded, when using the 2-D Non-Zero/Zero Cluster VLC Method together with an embodiment of the Basic Multi-Dimensional Amplitude VLC Method as:

$$C(z,n) + A_n(m(1), m(2), \ldots, m(n)) + S(1) + S(2) + \ldots + S(n),$$

and in one embodiment when using Cluster Runlength Identifying with Multi-dimensional Amplitude Event Identifying and Multi-dimensional Amplitude Coding, produces:

$$C(n) + A_n(m(1), m(2), \ldots, m(n)) + S(1) + S(2) + \ldots + S(n) + C'(z).$$

Figure 5:
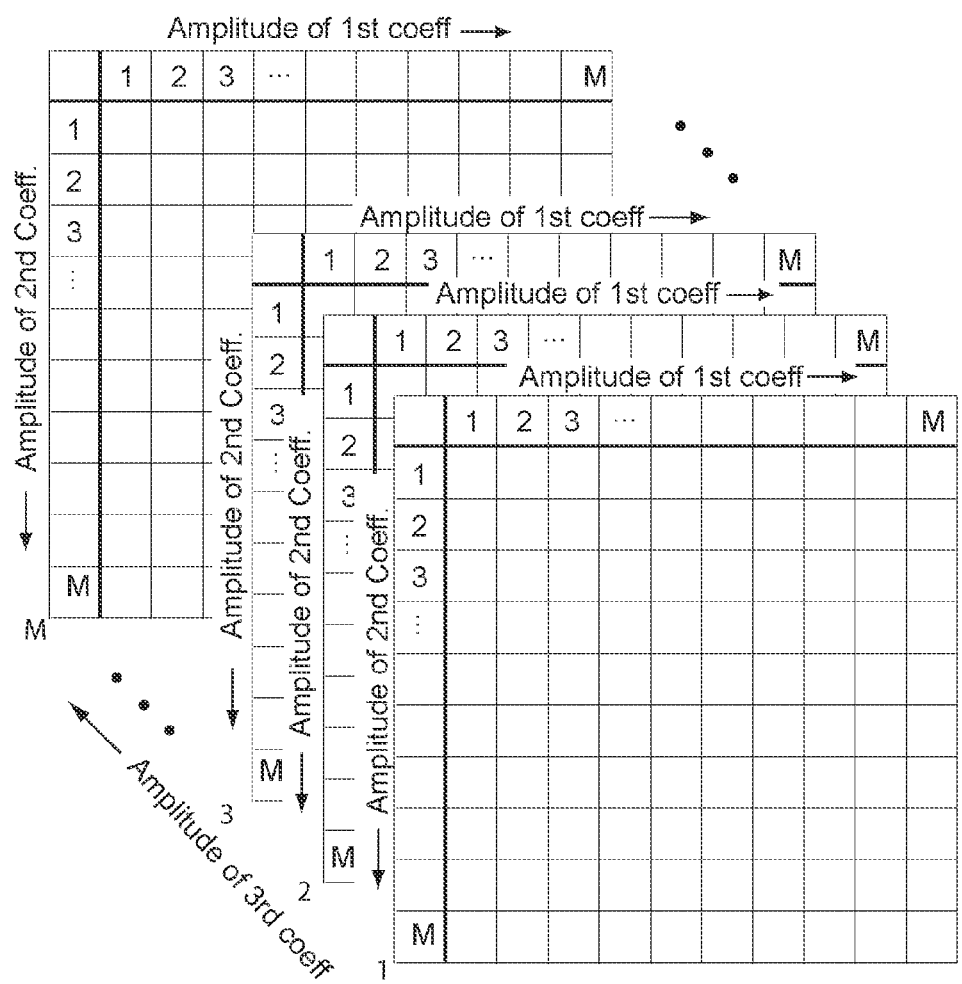
FIG. 5 shows a 3-D code table for the amplitudes of clusters of three consecutive non-zero coefficients for using the Basic Multi-Dimensional Amplitude VLC Method in one embodiment of the invention.

FIG. 5 shows a 3-D code table for the amplitudes of clusters of three consecutive non-zero coefficients for using Multi-dimensional Amplitude Coding in one embodiment of the invention.

In order to make the size of the multi-dimensional tables manageable from a practical implementation point of view, the maximum length of the run of non-zero amplitudes jointly encoded using Multi-dimensional Amplitude Event Identifying and Multi-dimensional Amplitude Coding is restricted to relatively low numbers such as 2 or 3 in a practical implementation.

Multi-Table Amplitude Event Coding

Another version of 207 or 307 uses Multi-Table Amplitude Event Identifying together with coding as described in the Multi-Table Amplitude VLC Method. We call such coding "Multi-Table Amplitude Event Coding" herein. The inventors observed that in clusters of non-zero-valued coefficients, the appearance of amplitude 1 is more likely than that of amplitude 2, the appearance of amplitude 2 is more likely than that of amplitude 3, and so forth. Thus, rather than using a single multidimensional coding table for a cluster of a number—say N—consecutive non-zero-valued coefficients, in Multi-Table Amplitude Event Identifying, events are identified within the cluster that each include a run of consecutive amplitude-1 coefficients, followed by a single coefficient of amplitude greater than 1. Included are events of only a single coefficient of amplitude greater than 1 and runs of only amplitude 1. For each event, a codeword is assigned to the runlength of the preceding run of amplitude-1 coefficients combined with the amplitude of the ending coefficient. In one version of Multi-Table Amplitude Event Coding, a two-dimensional coding table is used for each cluster length n, so that, for example, the multidimensional table of Multi-Dimensional Amplitude Event Coding is replaced by a number of increasingly large 2-D coding tables. The value of n can be as large as the position of the breakpoint. One view of the combination of Multi-Table Event Identifying and Multi-Table Coding is that it applies a modified 2D-VLC method within each cluster of consecutive non-zero-valued coefficients, with the most likely-to-occur amplitude in the cluster being 1, so that, within each cluster, one can view the method as applying a 2D-VLC method to a modified sequence of coefficients, with each coefficient amplitude reduced by 1, and with appropriate assumed or measured statistics for such clusters.

In one embodiment of the combination of Multi-Table Event Identifying and Multi-Table Coding, within each identified cluster of a number, denoted n, of non-zero valued coefficients, events are identified of consecutive amplitude-1 coefficients followed by single coefficient of amplitude greater than one. Such events include the runlength of 0 amplitude-1 coefficients followed by the single coefficient of amplitude greater than 1. Denote by j, j=0, 1, 2, . . . , n−1 the length of the amplitude 1 coefficients, and denote by k, k=2, 3, . . . , M the amplitude of the ending coefficient. It also is possible to have all 1's in the cluster. One embodiment of Multi-Table Coding includes assigning a variable length code for each identified event of the combination of the runlength of 1's and the amplitude of the final coefficient, or for an exception of all 1's. The variable length code may be assigned using assumed or measured statistics. A 2-D code table may be built to assign the codes. There is a different code table for each cluster length n. Denote by $C_n$(j,k) the variable length codeword. Denote by $n_{events}$ the number of such events in a cluster of length m, and $j_i$ and $k_i$ the runlength of preceding amplitude-1 coefficients, and the value of the final coefficient, respectively, in the ith event, i=1, 2, . . . , $n_{events}$, $j_i$=0, 1, . . . , and $k_i$=2, 3, . . . . Further denote by $S_i$(1), $S_i$(2), . . . , $S_i$($j_i$+1) the sign code of the non-zero coefficients in the ith event. Then, using an embodiment of Cluster Length and Position Identifying and encoding the identified position events, together with an embodiment of a combination of Multi-Table Amplitude Event Identifying and Multi-Table Amplitude Event Coding, and denoting concatenation over the values of i by $\Sigma_i$, the codewords are:

$$C(z,n) + \Sigma_i \{C_n(j_i,k_i) + S_i(1) + \ldots + S_i(j_i+1)\}.$$

Furthermore, using Cluster Runlength Identifying and encoding the identified position events, together with a combination of Multi-Table Amplitude Event Identifying and Multi-Table Amplitude Event Coding, the codewords are:

$$C(n) + \Sigma_i \{C_n(j_i,k_i) + S_i(1) + \ldots + S(j_i+1)\} + C'(z).$$

Figure 6:
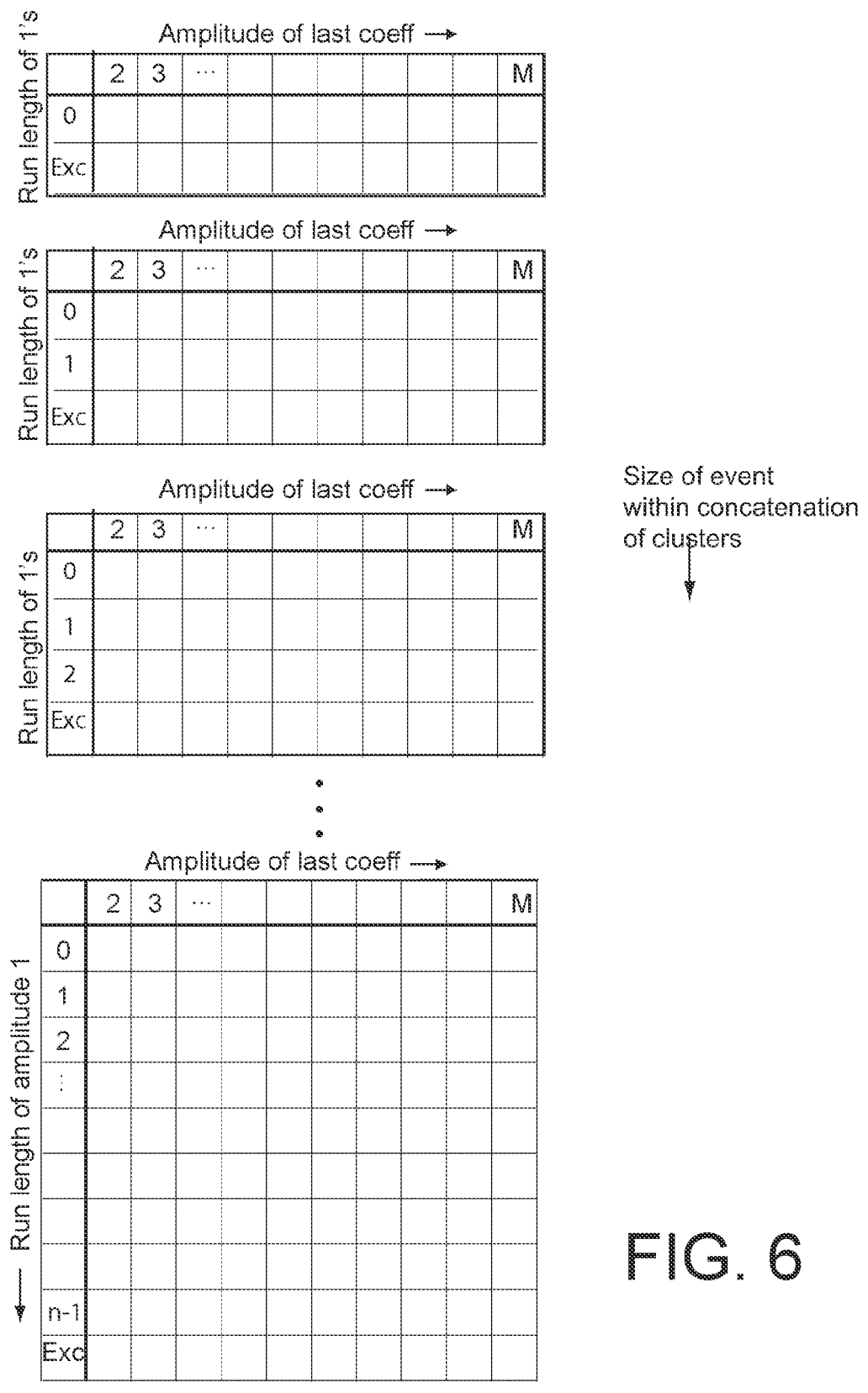

FIG. 6 shows a set of 2-D code tables for the events within a cluster of n non-zero coefficients, each event being a runlength of preceding amplitude 1 coefficients for the runlength=0, 1, . . . , n−1, followed by the final amplitude larger than 1, for using Multi-Table Coding in one embodiment of the invention.

Note that the inventors have noted that for short clusters, e.g., n=2 or 3, the Basic Multi-Dimensional Amplitude VLC Method works well, while for longer clusters, e.g., n>3, the Multi-Table Amplitude VLC Method is preferred. Thus, one embodiment uses both the Basic Multi-Dimensional Amplitude VLC Method and the Multi-Table Amplitude VLC Method depending on the length of the cluster of non-zero-valued coefficients.

For example, in the case that the Basic Multi-Dimensional Amplitude VLC Method is used for cluster lengths n≦3, and the Multi-Table Amplitude VLC Method is used for cluster lengths n>3, and the 2-D Non-Zero/Zero Cluster VLC Method is used for encoding the relative position of a cluster of non-zero-valued coefficients of length n, then the code for the cluster and position may be expressed as:

If $n \leq 3$ then $C(z,n)+A_n(m(1), m(2), \ldots, m(n))+S(1)+S(2)+ \ldots +S(n)$, else if $n>3$ then $C(z,n)+\Sigma_i \{C_n(j_i,k_i)+S_i(1)+ \ldots + S_i(j_i+1)\}$.

Another way of expressing this coding function is as:

$\alpha V_{R(z,n),A_n}\{R(z,n),m(1), \ldots, m(n)\}+(1-\alpha)V_{R(z,n),Cn}\{R(z,n),(j_1,k_1),j_2,k_2), \ldots \}$, where $\alpha=1$ for short clusters of non-zero-valued coefficients, for example, values of n=1, 2, or 3, and $\alpha=0$ for n>3.

To further improve the coding efficiency, in one version, the identified position events and the identified amplitude events are jointly encoded. Thus, 107 includes jointly coding the position code and amplitude code. One aspect of the Joint Position and Amplitude VLC Method of above-mentioned U.S. patent application Ser. No. 11/069,621 is jointly encoding the relative position and runlength of each clusters of non-zero valued coefficients with the amplitudes of the non-zero-coefficients in the cluster to form a joint codeword for the combination of the relative position of the cluster and of the non-zero amplitudes within the cluster. In particular, one aspect of the present invention is that rather than concatenating the codes for the position of clusters with the codes for the amplitudes of the non-zero coefficients in the clusters, a function of the position on the one hand, and non-zero amplitudes on the other hand, is used to obtain a single codeword for the position and non-zero-coefficient amplitudes of the cluster. In one embodiment, the signs of the non-zero amplitudes are included such that the function is also of the signs of the non-zero amplitudes.

As an example, the two-dimensional position code and the multi-dimensional amplitude code, e.g., N-dimensional amplitude code, were N is an integer greater than 1 may be jointly coded as a (2+N)-dimensional code. Construction of (2+N) dimensional code table for the low frequency coefficients simply becomes too large to be manageable. In order to reduce the size of the code table to a manageable size in the joint position and amplitude coding, the size of N needs to be restricted to a low number. With this restriction, those clustered coefficients with a large n can always be resorted back to a separate position and amplitude coding.

Note that with either using Cluster Runlength Identifying and encoding the identified position events, or using Cluster Length and Position Identifying and encoding the identified position events, the positions of the clusters are defined and encoded. Therefore, the inventors noticed, it is possible to concatenate all the clusters of non-zero-valued amplitudes to end up with longer clusters, and then to code the amplitudes in the concatenated clusters. For examples, since typically amplitude 1 is more likely to appear in such concatenations than other larger amplitudes, amplitude event identifying methods and related amplitude coding methods are possible that take this into account. These methods are the basis of methods and other aspects introduced in what we call the Concatenated Clusters VLC Method described in above-mentioned, incorporated herein by reference U.S. patent application Ser. No. 11/270,138 titled "EXTENDED AMPLITUDE CODING FOR CLUSTERED TRANSFORM COEFFICIENTS." How to incorporate those amplitude event identyfying method(s) and corresponding amplitude event coding methods would be clear to those in the art from the description herein, and the contents of U.S. patent application Ser. No. 11/270,138.

Example

Coding using aspects of the present invention are now described as an example. Examples of different versions of the position event identifying, the amplitude event identifying, and of the encoding are presented including using Cluster Runlength Identifying and 2-D Cluster Length and Position Identifying with separately amplitude coding each amplitude, 2-D Cluster Length and Position Identifying with Multi-Dimensional Amplitude Position Identifying and Coding, and 2-D Cluster Length and Position Identifying with the Multi-Table Amplitude Event Identifying and Amplitude Coding.

Suppose a sequence of quantized transform coefficients in the series is as follows, excluding the DC coefficient:
3 −1 1 1 −2 1 1 0 0 −1 2 1 1 −1 0 0 0 1 0 . . .

Coding using 2-D Cluster Length and Position Identifying and position coding with separate amplitude coding of the non-zero-valued coefficients includes identifying events of a run of zero-valued coefficients preceding a run (cluster) of non-zero coefficients followed by a single zero-valued coefficient. Using | to separate such events, the series consists of:
|3 −1 1 1 −2 1 1 0|0 −1 2 1 1 −1 0|0 0 1 0| . . .

The code is:

$|C(0, 7) + (A(3) + S_+) + (A(1) + S_-) + (A(1) + S_+) +$ $(A(1) + S_+) + (A(2) + S_-) + (A(1) + S_+) + (A(1) + S_+)| +$ $|C(1, 5) + (A(1) + S_-) + (A(2) + S_+) + (A(1) + S_+) +$ $(A(1) + S_+) + (A(1) + S_-)| + |C(2, 1) + (A(1) + S_+) + EOB$ where C(z,n) represents position code for 2D non-zero/zero clusters, where z is the number of zero-valued coefficients preceding a cluster of non-zero-valued coefficients followed by a single zero-valued coefficient, and where n is the number of non-zero-valued coefficients in the cluster. A(i) is the one-dimensional amplitude code for a non-zero amplitude of i, while $S_+$ and $S_-$ represents codes used to encode positive and negative signs, respectively. EOB denotes the code indicating the rest of the series is zero amplitude coefficients.

Coding using 2-D Cluster Length and Position Identifying and position event coding with the Multi-Dimensional Amplitude Event Identifying and Coding to code the position and amplitudes of clusters non-zero-valued coefficients includes identifying events of a run of zero-valued coefficients preceding a run (cluster) of non-zero coefficients followed by a single zero-valued coefficient. Using | to separate such events, the series consists of:
|3 −1 1 1 −2 1 1 0|0 −1 2 1 1 −1 0|0 0 1 0| . . .

The code is:

$|C(0,7)+A_7(3,1,1,1,2,1,1)+S_++S_-+S_++S_++S_-+S_++S_+)|+$
$|C(1,5)+A_5(1,2,1,1,1)+S_-+S_++S_++S_++S_-)|+|C(2,1)+A_1(1)+S_+)|+EOB$ where $A_n(.)$ are n-dimensional functions of the amplitudes of the n-consecutive non-zero amplitudes in a cluster. Note that in practice, it is unlikely that the seven-dimensional codes $A_7$ would be used, and such a code is presented here for illustrative purposes only.

Coding using the 2-D Cluster Length and Position Identifying and position event coding and the Multi-Table Amplitude Event Identifying and Coding to code the positions and amplitudes of clusters of non-zero-valued coefficients includes identifying runs of zero-valued coefficients preceding runs (cluster) of non-zero coefficients followed by a single zero-valued coefficient, then within a cluster of n consecutive non-zero coefficients, identifying events of a run of consecutive amplitude 1 coefficients followed by a single coefficient of amplitude greater than 1. Using | to separate such runs of zero preceding clusters of non-zeroes followed by a single zero, the series consists of:

|3 −1 1 1 −2 1 1 0|0 −1 2 1 1 −1 0|0 0 1 0| . . .

The code is:

$$|C(0,7)+C_7(0,3)+S_++C_7(3,2)+S_-+S_++S_++S_-+C_7(\text{Exc})+\\ S_++S_+)|+|C(1,5)+C_5(1,2)+S_-+S_++C_5(\text{Exc})+S_++\\ S_++S_-|+|C(2,1)+C_1(\text{Exc})+S_+)|\text{EOB}$$

where by $C_n(j,k)$ denotes the variable length codeword within a cluster of n non-zero-valued coefficients for a run of j amplitude-1 coefficients preceding a coefficient of value k>1, and $C_n(\text{Esc})$ denotes codeword within a cluster of n non-zero-valued coefficients for a run of only amplitude-1 coefficients that is not followed by a coefficient of amplitude greater than 1.

Apparatus

Figure 7:
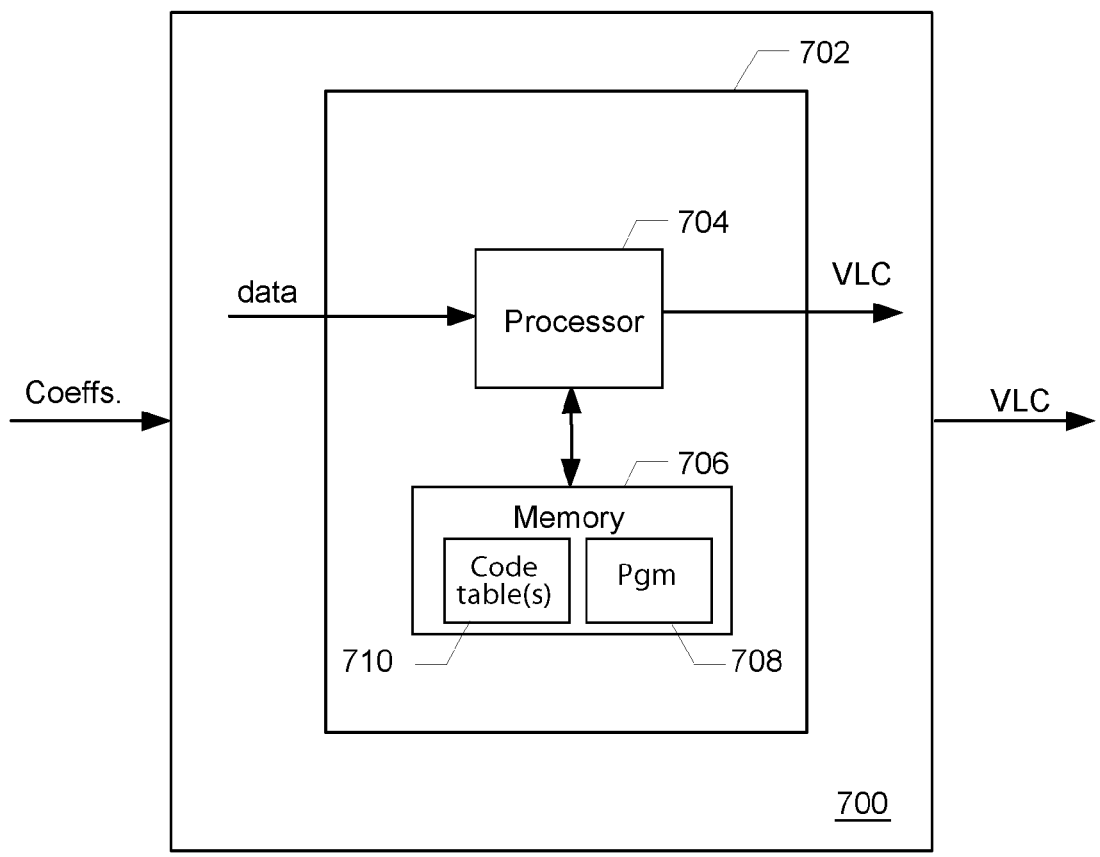
FIG. 7 shows an apparatus for coding a series of digital signals, e.g., an ordered series of quantized coefficients of a transformed block of image data, including a processing system that has a memory containing code that implements an embodiment of the coding method described herein.

Another aspect of the invention is an apparatus for coding a series of digital signals, e.g., an ordered series of quantized coefficients of a transformed block of image data. FIG. 7 shows an apparatus 700 that includes a processing system 702 that includes one or more processors 704 and a memory 706. A single processor is shown in FIG. 7 and those in the art will appreciate that this may represent several processors. Similarly, a single memory subsystem 706 is shown, and those in the art will appreciate that the memory subsystem may include different elements such as RAM, ROM, and so forth. In addition, the memory subsystem is meant to include any non-volatile memory storage such as a magnetic or optical storage component. A computer program 708 is included and is loaded into the memory 706. Note that at any time, some of the program may be in different parts of the memory subsystem, as will be understood by those in the art. The program 708 includes instructions to instruct the processor to implement, in different versions, the different coding methods described above. The processor thus accepts as data the ordered coefficients and generates the codewords. The apparatus 700 further includes in the memory subsystem 706 a coding data structure 710 that provides the codewords for sets of one or more coefficients as described in any one of the novel coding methods described herein. In one embodiment, the data structure is in the form of the coding tables for the position codes and for the amplitude codes, and for the joint coding function of position code and amplitude code.

Note that FIG. 7 does not show details such as bus structures, I/O structures, etc., that may be included since the need for such structures would be known to those in the art and their inclusion would only obscure the inventive aspects of the apparatus. Furthermore, the processing system may be implemented using one or more general purpose microprocessors, one or more microcontrollers that include several memory and other elements, one or more DSP devices, or any other programmable processors. Furthermore, the processors may be standalone devices, or may be implemented as "cores" to be included in an ASIC, gate array, or other device.

Another aspect of the invention is a memory (such as memory 706 in FIG. 7) that stores a coding data structure that provides the codewords for sets of one or more coefficients as described in any one of the novel coding methods described herein. In one embodiment, the data structure is in the form of one or more tables.

Other aspects of the invention include, corresponding to each novel coding method described herein, a computer-readable hardware storage medium on which is stored a set of instructions that when executed by one or more processors of a processing system carry out the novel coding method described herein.

Thus, a variable length coding method and apparatus has been described suitable for encoding the quantized transform coefficients of blocks of images as occur in common image compression methods.

Another aspect of the invention is a method to decode a bitstream in order to form a series of quantized coefficients of a transform of a block of image data, the transform such that 0 is the most likely coefficient amplitude and 1 is the next most likely coefficient amplitude. The bitstream is encoded by the coding method described above including identifying clusters of at least one non-zero-valued coefficients, and for each such cluster, identifying at least one position event to identify the relative position and runlength of the cluster of non-zero coefficients, and identifying at least one amplitude event to define the non-zero amplitudes in the cluster of non-zero coefficients. The method further includes coding the identified position event(s), and further coding the amplitudes in one or more concatenations of the identified amplitude event(s) such that relatively short codewords are formed to represent values or sequences of values that are relatively more likely-to-occur, and relatively long codewords are formed to represent values or sequences of values that are relatively less likely-to-occur. The method is particularly applicable to encoding a series where there is likely to be a cluster of non-zero-valued coefficients.

The decoding method includes recognizing one or more position codewords, determining the positions of clusters of non-zero-valued coefficients from the position codewords, recognizing one or more amplitude codewords, determining the amplitudes and signs of the non-zero-coefficients in the concatenations represented by the recognized amplitude codewords; and determining the sub-series of coefficients from recognized codewords until all coefficients in the series are determined.

Figure 8:
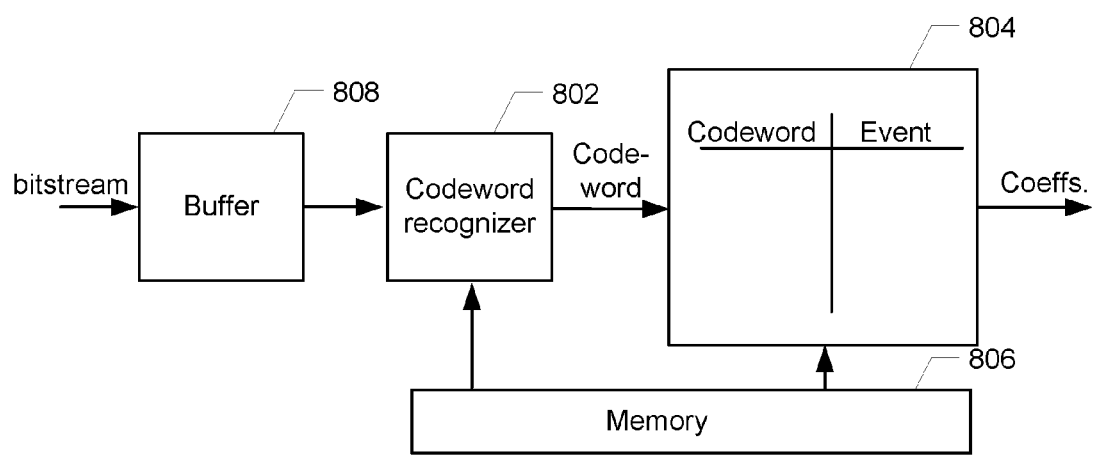
FIG. 8 shows an apparatus embodiment for decoding a bitstream representing a series of codewords encoded according to one or more aspects of the present invention.

Another aspect of the invention is an apparatus for decoding a bitstream encoded by any of the methods described herein. FIG. 8 shows one embodiment of the apparatus. A codeword recognizer 802 accepts the bits of a bitstream and recognizes a codeword of a set of possible codewords. The codeword recognizer determines which of the a set of coding tables the codeword is from. A decoder 804 is coupled to the codeword recognizer 802 and determines the data for the codeword recognized by the codeword recognizer, e.g., the runlength of non-zeroes, the runlength of zeroes, the sign, etc. In one embodiment, the decoder 804 includes a lookup device that looks up the appropriate decoding table stored in a memory 806. That table provides the event that corresponds to at least some of the codewords of the set of codewords, e.g., the relative position in the case of a position codeword, or an amplitude event, or sign information. Other codewords may include an escape code, so that decoding is by other than a table lookup method. In one embodiment, the bitstream is stored in a buffer 808, and the output of the buffer is coupled to the codeword recognizer. The apparatus for decoding implements a codeword decoding method that includes recognizing one or more position codewords, determining the positions of clusters of non-zero-valued coefficients from the position codewords, recognizing one or more amplitude codewords, determining the amplitudes and signs of the non-zero-coefficients in the concatenations represented by the recognized amplitude codewords; and determining the sub-series of coefficients from recognized codewords until all coefficients in the series are determined.

While in the embodiment shown in FIG. 8, the memory is shown separate from the lookup device, those in the art will understand that in other embodiments, the lookup device includes memory for the tables, and such other embodiments are included herein.

Note further that in FIG. 8, the codeword recognizer and also the lookup device may be each implemented on a computer as a set of instructions stored in a memory, e.g., the memory 806, that instruct one or more processors to carry out the operations of the recognition and of the lookup.

Another aspect of the invention is a memory (such as memory 806 in FIG. 8) that stores a decoding data structure that provides the data for any set of codewords recognized in a bitstream of compressed image data. The bitstream is coded by any one of the novel coding methods described herein. In one embodiment, the data structure is in the form of one or more tables.

Other aspects of the invention include, corresponding to each novel decoding methods described herein, a computer-readable hardware storage medium on which is stored a set of instructions that when executed by one or more processors of a processing system carry out the novel decoding method described herein.

Thus, a decoding method and apparatus for a variable length coding method and apparatus have been described suitable for decoding codewords to produce quantized transform coefficients of blocks of images as occur in common image compression methods from codewords produced by any of the novel coding methods described herein.

The coding and decoding methodologies described herein are, in one embodiment, performable by a machine which includes a one or more processors that accept instructions. For any of the methods described herein, when the instructions are executed by the machine, the machine performs the method. Any machine capable of executing a set of instructions (sequential or otherwise) that specify actions to be taken by that machine are included. Thus, one typical machine may be exemplified by a typical processing system that includes one or more processors. Each processor may include one or more of a CPU, might be in the form of a programmable DSP unit, and may include a graphics processing unit in the case graphic processing is involved. The processing system typically includes a memory subsystem that may have RAM and/or a static RAM, and/or ROM. The memory may be imbedded, e.g., as part of DSP unit. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a computer-readable hardware storage medium that stored machine readable instructions (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute a storage medium configured with machine readable instructions.

In alternative embodiments, the machine operates as a standalone device or may be connected, e.g., networked to other machines, in a networked deployment, the machine may operate in the capacity of a server or a client machine in a server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., one or more processors that are part of an image encoder. Thus, as will be appreciated by those skilled in the art, embodiments of the present invention may be embodied as a method, an apparatus such as a special purpose apparatus, an apparatus such as a data processing system, or a computer-readable hardware storage medium, e.g., a computer program product. The computer-readable storage medium has stored therein one or more instructions for controlling a processing system to implement a method. Accordingly, aspects of the present invention may take the form of a method, an entirely hardware embodiment, an entirely software embodiment or an embodiment combining software and hardware aspects. Furthermore, the present invention may take the form of a computer-readable hardware storage medium (e.g., a computer program product on a computer-readable hardware storage medium) having encoded thereon program instructions embodied in the medium.

The software may further be transmitted or received over a network via the network interface device. While the storage medium is shown in an exemplary embodiment to be a single medium, the term "storage medium" should be taken to include a single medium or multiple media (e.g., a centralized or distributed database, and/or associated caches and servers) that store the one or more sets of instructions. The term "storage medium" shall also be taken to include any hardware storage medium that is capable of storing or encoding a set of instructions for execution by the machine and that cause the machine to perform any one or more of the methodologies of the present invention. A hardware storage medium may take many forms, including but not limited to, non-volatile media and volatile media. Non-volatile media includes, for example, optical, magnetic disks, and magneto-optical disks. Volatile media includes dynamic memory, such as main memory. For example, the term "hardware storage medium" shall accordingly be taken to include, but not be limited to one or more of: solid-state memories, optical and magnetic media.

Another aspect of the invention is a computer-readable hardware storage medium on which are stored the codewords produced by one or more of the coding methods described herein.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method or a means for carrying out the method or element of a method. Furthermore, an element described herein of an apparatus embodiment is an example of a means for carrying out the function performed by the element for the purpose of carrying out the invention.

It should further be appreciated that although the invention has been described in the context of transform encoding of images, the invention is not limited to such contexts and may be utilized in various other compression applications and systems. Furthermore, the invention is not limited to any one type of architecture or type of transform encoding. For example, the DCT is mentioned above as one transform. Other transforms may be used, e.g., the new H.264/MEG-4 AVC video coding standard/draft standard defines 4×4 blocks and a DCT-like 4×4 integer transform. The invention does not depend on any particular type of interframe coding if used, or of motion compensation if used for interframe coding, or any intra-estimation if used for estimating the pixels of a block using information from neighboring blocks.

Note that variable length coding is sometimes referred to as entropy coding or statistical coding.

Note that in one embodiment for amplitude encoding, 127 possible non-zero values are possible for the coefficients. The invention however is not restricted to any number of possible quantization values.

Note also that the term amplitude is irrespective of sign. Therefore, for example, coefficient of values +1 and −1 both have amplitude 1.

Note that the terms coding and encoding are used interchangeably herein.

Note also that the present invention does not depend on the particular type of VLC used for any of the coding methods, e.g., the coding tables, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

All U.S. patent publications, PCT patent publications designating the United States, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noted that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating processing hardware, the method comprising:
 (a) accepting image data represented by an ordered series of digital signals representing a block of quantized coefficients of a transformed block of image data, the signals each having a respective value, including a respective amplitude from a finite set of amplitudes consisting of a most likely-to-occur amplitude and at least one other amplitude, the at least one other amplitude including a second-most likely-to-occur amplitude;

(b) using a position event identifying method executing on the processing hardware to identify position events that each include a cluster of at least one consecutive signal having any amplitude other than the most likely-to-occur amplitude, such that the position events define the positions and runlengths of the clusters and of any intervening runs of consecutive signals having the most likely-to-occur amplitude;

(c) using an amplitude event identifying method executing on the processing hardware to identify amplitude events defining the amplitudes of the signals having amplitudes other than the most likely-to-occur amplitude; and (d) encoding the identified position events, the identified amplitude events, and the signs of the amplitudes other than the most likely-to-occur amplitude in the identified amplitude events, such that for at least some of the identified position events and identified amplitude events, events containing a cluster of signals having more likely-to-occur signal amplitudes other than the most likely-to-occur amplitude are each encoded by a concatenation of one or more codewords that is shorter than the concatenation of the one or more codewords that encodes at least one event containing a cluster of signals having less likely-to-occur signal amplitudes other than the most likely-to-occur amplitude; and (e) outputting the codewords formed by the encoding, wherein the position event identifying method uses 2-D Cluster Length and Position Identifying, 2-D Cluster Length and Position Identifying including identifying position events that each includes a run of one or more consecutive signals having other than the most likely-to-occur amplitude preceded by either no signals having the most likely-to-occur amplitude, or a run of one or more consecutive zero-valued signals having the most likely-to-occur amplitude, each position event identified by the runlengths of the preceding run of consecutive zero-valued signals having the most likely-to-occur amplitude, including a runlength of 0, and the runlength of the run of consecutive signals having other than the most likely-to-occur amplitude.

2. A method as recited in claim 1, wherein the transformed block of image data is formed using a transform configured such that the most likely-to-occur amplitude is 0, and the second-most likely-to-occur amplitude is 1, such that the step of identifying of position events identifies events that include a cluster of one or more non-zero-valued coefficients.

3. A method as recited in claim 1, wherein the transformed block of image data is formed using a transform configured such that the most likely-to-occur amplitude is 0, and the second-most likely-to-occur amplitude is 1, such that the step of identifying of position events identifies events that include a cluster of one or more non-zero-valued coefficients, and wherein the transformed block of image data includes a DC term, and wherein the DC term is separately encoded, such that the series of digital signals is a set of non-DC quantized coefficients of a transformed block of image data.

4. A method as recited in claim 1, wherein the transformed block of image data is formed using a transform configured such that the most likely-to-occur amplitude is 0, and the second-most likely-to-occur amplitude is 1, such that the step of identifying of position events identifies events that include a cluster of one or more non-zero-valued coefficients, and wherein (d) includes separately encoding the signs of the amplitudes.

5. A method as recited in claim 1, wherein the transformed block of image data is formed using a transform configured such that the most likely-to-occur amplitude is 0, and the second-most likely-to-occur amplitude is 1, such that the step of identifying of position events identifies events that include a cluster of one or more non-zero-valued coefficients, and wherein the encoding of the amplitude events and of the position events uses coding tables.

6. A method as recited in claim 5, wherein each of the respective coding tables is constructed by assigning a variable length code to at least some of the respective events being coded by the coding table according to measured or assumed statistics of the respective event being coded by the coding table.

7. A method as recited in claim 1, wherein the amplitude event identifying method uses Multi-Dimensional Amplitude Event Identifying, Multi-Dimensional Amplitude Event Identifying including identifying amplitude events that include a run of consecutive signals of amplitude or amplitudes other than the most likely-to-occur amplitude.

8. A method as recited in claim 1, wherein the amplitude event identifying method uses:

(a) Multi-Table Amplitude Event Identifying that includes, in each run of consecutive signals of value or values having other than the most likely-to-occur amplitude, identifying amplitude events of at least one consecutive signal, an identified amplitude event including a sequence of at least one consecutive signal having the next most likely-to-occur amplitude that ends in a signal having other than the second-most likely-to-occur amplitude, or ascertaining that the amplitude event has only a signal having other than the second-most likely-to-occur amplitude, or ascertaining that the amplitude event has only a sequence of consecutive signals having the second-most likely-to-occur amplitude, each identified amplitude event defined by the length of the run of consecutive signals of amplitude value or values other than the most likely-to-occur amplitude, the length of the sequence of at least one consecutive signal having the second-most likely-to-occur amplitude, and by the amplitude of the last signal in the run, or (b) a third amplitude event identifying method that includes, in each run of consecutive signals of value or values having other than the most likely-to-occur amplitude, identifying amplitude events of a single signal having other than the most likely-to-occur amplitude.

9. A method as recited in claim 1, wherein the position event identifying method uses 2-D Cluster Length and Position Identifying and wherein the amplitude event identifying method identifies individual amplitudes in the clusters.

10. A method as recited in claim 1, wherein the encoding of the identified position and amplitude events includes encoding the identified position events jointly with the identified amplitude events.

11. A method as recited in claim 1, wherein the encoding of the identified position and amplitude events includes separately encoding the identified position events and the identified amplitude events.

12. A computer-readable hardware storage medium configured with instructions that when executed by at least one processor of a processing system cause the processing system to carry out a method, the method comprising:

(a) accepting image data represented by an ordered series of digital signals representing a block of quantized coefficients of a transformed block of image data, the signals each having a respective value, including a respective_amplitude from a finite set of amplitudes consisting of a most likely-to-occur amplitude and at least one other amplitude, the at least one other amplitude including a second-most likely-to-occur amplitude;

(b) using a position event identifying method executing on the processing hardware to identify position events that each include a cluster of at least one consecutive signal having any amplitude other than the most likely-to-occur amplitude, such that the position events define the positions and runlengths of the clusters and of any intervening runs of consecutive signals having the most likely-to-occur amplitude;

(c) using an amplitude event identifying method executing on the processing hardware to identify the amplitudes of the signals having amplitudes other than the most likely-to-occur amplitude; and (d) encoding the identified position events and encoding the identified amplitude events by respective codewords, and encoding the signs of the amplitudes other than the most likely-to-occur amplitude in the identified amplitude events, such that for at least some of the identified position events and identified amplitude events, events containing a cluster of signals having more likely-to-occur signal amplitudes other than the most likely-to-occur amplitude are each encoded by a concatenation of one or more codewords that is shorter than the concatenation of one or more codewords that encodes at least one event containing a cluster of signals having less likely-to-occur signal amplitudes other than the most likely-to-occur amplitude; and (e) outputting the codewords formed by the encoding, wherein the position event identifying method uses 2-D Cluster Length and Position Identifying, 2-D Cluster Length and Position Identifying including identifying position events that each includes a run of one or more consecutive signals having other than the most likely-to-occur amplitude preceded by either no signals having the most likely-to-occur amplitude, or a run of one or more consecutive zero-valued signals having the most likely-to-occur amplitude, each position event identified by the runlengths of the preceding run of consecutive zero-valued signals having the most likely-to-occur amplitude, including a runlength of 0, and the runlength of the run of consecutive signals having other than the most likely-to-occur amplitude.

13. A computer-readable hardware storage medium as recited in claim 12, wherein the transformed block of image data is formed using a transform configured such that the most likely-to-occur amplitude is 0, and the second-most likely-to-occur amplitude is 1, such that the step of identifying of position events identifies events that include a cluster of one or more non-zero-valued coefficients.

14. A computer-readable hardware storage medium as recited in claim 12, wherein the transformed block of image data is formed using a transform configured such that the most likely-to-occur amplitude is 0, and the second-most likely-to-occur amplitude is 1, such that the step of identifying of position events identifies events that include a cluster of one or more non-zero-valued coefficients, and wherein the encoding of the identified position and amplitude events includes encoding the identified position events jointly with the identified amplitude events.

15. A computer-readable hardware storage medium as recited in claim 12, wherein the transformed block of image data is formed using a transform configured such that the most likely-to-occur amplitude is 0, and the second-most likely-to-occur amplitude is 1, such that the step of identifying of position events identifies events that include a cluster of one or more non-zero-valued coefficients, and wherein the encoding of the identified position and amplitude events includes separately encoding the identified position events and the identified amplitude events.

16. A computer-readable hardware storage medium as recited in claim 12, wherein the amplitude event identifying method uses Multi-Dimensional Amplitude Event Identifying, Multi-Dimensional Amplitude Event Identifying including identifying amplitude events that include a run of consecutive signals of amplitude or amplitudes other than the most likely-to-occur amplitude.

17. A computer-readable hardware storage medium as recited in claim 12, wherein the amplitude event identifying method uses:

(a) Multi-Table Amplitude Event Identifying, Multi-Table Amplitude Event Identifying including in each run of consecutive signals of value or values having other than the most likely-to-occur amplitude, identifying amplitude events of at least one consecutive signal, an identified amplitude event including a sequence of at least one consecutive signal having the next most likely-to-occur amplitude that ends in a signal having other than the second-most likely-to-occur amplitude, or ascertaining that the amplitude event has only a signal having other than the second-most likely-to-occur amplitude, or ascertaining that the amplitude event has only a sequence of consecutive signals having the second-most likely-to-occur amplitude, each identified amplitude event defined by the length of the run of consecutive signals of amplitude value or values other than the most likely-to-occur amplitude, the length of the sequence of at least one consecutive signal having the second-most likely-to-occur amplitude, and by the amplitude of the last signal in the run, or (b) a third amplitude event identifying method that includes, in each run of consecutive signals of value or values having other than the most likely-to-occur amplitude, identifying amplitude events of a single signal having other than the most likely-to-occur amplitude.

18. An apparatus for processing an ordered series of digital signals, the signals being quantized coefficients of a transformed block of image data, each signal having a respective value including an amplitude from a finite set of amplitudes consisting of a most likely-to-occur amplitude and at least one other amplitude, the at least one other amplitude including a second-most likely-to-occur amplitude to the most likely-to-occur amplitude, the apparatus comprising:

(a) means for using a position event identifying method to identify position events that each include a cluster of at least one consecutive signal having any amplitude other than the most likely-to-occur amplitude, such that the position events define the positions and runlengths of the clusters and of any intervening runs of consecutive signals having the most likely-to-occur amplitude;

(b) means for using an amplitude event identifying method to identify the amplitudes of the signals having amplitudes other than the most likely-to-occur amplitude; and (c) means for encoding the identified position events, for encoding the identified amplitude events, and for encoding the signs of the amplitudes other than the most likely-to-occur amplitude in the identified amplitude events, such that for at least some of the signals having amplitudes other than the most likely-to-occur amplitude, clusters of signals having more likely-to-occur signal amplitudes are each encoded by a concatenation of one or more codewords that is shorter) than the concatenation of the one or more codewords that encodes at least one cluster of signals having less likely-to-occur signal amplitudes, wherein the position event identifying method uses 2-D Cluster Length and Position Identifying, 2-D Cluster Length and Position Identifying including identifying position events that each includes a run of one or more consecutive signals having other than the most likely-to-occur amplitude preceded by either no signals having the most likely-to-occur amplitude, or a run of one or more consecutive zero-valued signals having the most likely-to-occur amplitude, each position event identified by the runlengths of the preceding run of consecutive zero-valued signals having the most likely-to-occur amplitude, including a runlength of 0, and the runlength of the run of consecutive signals having other than the most likely-to-occur amplitude.

19. An apparatus as recited in claim 18, wherein the transformed block of image data is formed using a transform configured such that the most likely-to-occur amplitude is 0, and the second-most likely-to-occur amplitude is 1, such that the identifying of position events identifies events that include a cluster of one or more non-zero-valued coefficients the most likely-to-occur amplitude is 0.

20. A method of operating processing hardware, the method comprising:

accepting a coded bitstream representing blocks of image data coded according to a coding method;
recognizing codewords in the coded bitstream; and
decoding the codewords,
wherein the coding method includes:
(a) accepting image data represented by an ordered series of digital signals representing a block of quantized coefficients of a transformed block of image data, the signals each having a respective value, including a respective_amplitude from a finite set of amplitudes consisting of a most likely-to-occur amplitude and at least one other amplitude, the at least one other amplitude including a second-most likely-to-occur amplitude;
(b) using a position event identifying method executing on the processing hardware to identify position events that each include a cluster of at least one consecutive signal having any amplitude other than the most likely-to-occur amplitude, such that the position events define the positions and runlengths of the clusters and of any intervening runs of consecutive signals having the most likely-to-occur amplitude;
(c) using an amplitude event identifying method executing on the processing hardware to identify the amplitudes of the signals having amplitudes other than the most likely-to-occur amplitude; and
(d) encoding the identified position events and encoding the identified amplitude events by respective codewords, and encoding the signs of the amplitudes other than the most likely-to-occur amplitude in the identified amplitude events, such that for at least some of the identified position events and identified amplitude events, events containing a cluster of signals having more likely-to-occur signal amplitudes other than the most likely-to-occur amplitude are each encoded by a concatenation of one or more codewords that is shorter than the concatenation of the one or more codewords that encodes at least one event containing a cluster of signals having less likely-to-occur signal amplitudes other than the most likely-to-occur amplitude; and (e) outputting the codewords formed by the encoding,
wherein the position event identifying method uses 2-D Cluster Length and Position Identifying, 2-D Cluster Length and Position Identifying including identifying position events that each includes a run of one or more consecutive signals having other than the most likely-to-occur amplitude preceded by either no signals having the most likely-to-occur amplitude, or a run of one or more consecutive zero-valued signals having the most likely-to-occur amplitude, each position event identified by the runlengths of the preceding run of consecutive zero-valued signals having the most likely-to-occur amplitude, including a runlength of 0, and the runlength of the run of consecutive signals having other than the most likely-to-occur amplitude.

21. A method as recited in claim 20, wherein the transformed block of image data is formed using a transform configured such that the most likely-to-occur amplitude is 0, and the second-most likely-to-occur amplitude is 1, such that the identifying of position events identifies events that include a cluster of one or more non-zero-valued coefficients the most likely-to-occur amplitude is 0.

22. An apparatus for processing a coded bitstream representing blocks of image data coded according to a coding method, the apparatus comprising;

means for recognizing codewords in the coded bitstream; and
means for decoding the codewords,
wherein the coding method includes:
(a) accepting image data represented by an ordered series of digital signals representing a block of quantized coefficients of a transformed block of image data, the signals each having a respective value, including a respective_amplitude from a finite set of amplitudes consisting of a most likely-to-occur amplitude and at least one other amplitude, the at least one other amplitude including a second-most likely-to-occur amplitude;
(b) using a position event identifying method executing on the processing hardware to identify position events that each include a cluster of at least one consecutive signal having any amplitude other than the most likely-to-occur amplitude, such that the position events define the positions and runlengths of the clusters and of any intervening runs of signals having the most likely-to-occur amplitude;
(c) using an amplitude event identifying method executing on the processing hardware to identify the amplitudes of the signals having amplitudes other than the most likely-to-occur amplitude; and
(d) encoding the identified position events and encoding the identified amplitude events by respective codewords, and encoding the signs of the amplitudes other than the most likely-to-occur amplitude in the identified amplitude events, such that for at least some of the identified position events and identified amplitude events, events containing a cluster of signals having more likely-to-occur signal amplitudes other than the most likely-to-occur amplitude are each encoded by a concatenation of one or more codewords that is shorter than each concatenation of the one or more codewords that encodes at least one event containing a cluster of signals having less likely-to-occur signal amplitudes other than the most likely-to-occur amplitude; and (e) outputting the codewords formed by the encoding,
wherein the position event identifying method uses 2-D Cluster Length and Position Identifying, 2-D Cluster Length and Position Identifying including identifying position events that each includes a run of one or more consecutive signals having other than the most likely-to-occur amplitude preceded by either no signals having the most likely-to-occur amplitude, or a run of one or more consecutive zero-valued signals having the most likely-to-occur amplitude, each position event identified by the runlengths of the preceding run of consecutive zero-valued signals having the most likely-to-occur amplitude, including a runlength of 0, and the runlength of the run of consecutive signals having other than the most likely-to-occur amplitude.

23. An apparatus as recited in claim 22, wherein the transformed block of image data is formed using a transform configured such that the most likely-to-occur amplitude is 0, and the second-most likely-to-occur amplitude is 1, such that the identifying of position events identifies events that include a cluster of one or more non-zero-valued coefficients the most likely-to-occur amplitude is 0.

* * * * *